(12) United States Patent
Kitanaka

(10) Patent No.: US 7,772,806 B2
(45) Date of Patent: Aug. 10, 2010

(54) POWER STORAGE SYSTEM

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 725 days.

(21) Appl. No.: 11/663,648

(22) PCT Filed: Apr. 11, 2006

(86) PCT No.: PCT/JP2006/307651

§ 371 (c)(1),
(2), (4) Date: Mar. 23, 2007

(87) PCT Pub. No.: WO2007/116530

PCT Pub. Date: Oct. 18, 2007

(65) Prior Publication Data

US 2009/0015199 A1   Jan. 15, 2009

(51) Int. Cl.
*H02J 7/04* (2006.01)
*H02M 7/00* (2006.01)

(52) U.S. Cl. .............. 320/140; 320/114; 320/116; 320/162; 363/13

(58) Field of Classification Search .............. 320/140
See application file for complete search history.

(56) References Cited

U.S. PATENT DOCUMENTS 6,175,511 B1   1/2001  Ooba
7,402,983 B2 *  7/2008  Jacobson et al. ............ 323/214

FOREIGN PATENT DOCUMENTS

| JP | 6-245501 A | 9/1994 |
| JP | 7-064658 A | 3/1995 |
| JP | 7-336912 A | 12/1995 |
| JP | 2000-050402 | 2/2000 |
| JP | 2001-016790 A | 1/2001 |
| JP | 2001-069672 | 3/2001 |
| JP | 2001-136681 A | 5/2001 |

(Continued)

OTHER PUBLICATIONS

International Search Report Application No. PCT/JP2006/307651 dated Oct. 26, 2007.

*Primary Examiner*—Edward Tso
*Assistant Examiner*—Johali A Torres Ruiz
(74) *Attorney, Agent, or Firm*—Buchanan Ingersoll & Rooney PC

(57) ABSTRACT

A power storage system regulates DC power from a DC power supply into prescribed voltage and current using a DC-DC converter unit for storage in a storage unit. On the DC power supply side of the DC-DC converter, the system includes a primary side current detecting unit, a primary side voltage detecting unit, a primary side switch unit, and a primary side filter unit. On the storage unit side of the DC-DC converter, the system includes a secondary side filter unit, a secondary side switch unit, a secondary side voltage detecting unit, and a secondary side current detecting unit. The on/off states of the primary and secondary side switch units, and the DC-DC converter unit are controlled by a system control unit provided with an externally applied operation command and signals obtained from elements such as the primary side current detecting unit and the primary side voltage detecting unit.

41 Claims, 23 Drawing Sheets

FOREIGN PATENT DOCUMENTS

| | | |
|---|---|---|
| JP | 2001-186689 | 7/2001 |
| JP | 2001-260719 | 9/2001 |
| JP | 2002-233052 A | 8/2002 |
| JP | 2002-320390 A | 10/2002 |
| JP | 2003-018746 | 1/2003 |
| JP | 2003-199354 A | 7/2003 |
| JP | 2004-194475 | 7/2004 |
| JP | 2004-289950 A | 10/2004 |
| JP | 2004-350478 | 12/2004 |
| JP | 2005-162076 | 6/2005 |
| JP | 2005-206111 A | 8/2005 |
| JP | 2005-245185 A | 9/2005 |

* cited by examiner

POWER STORAGE SYSTEM

TECHNICAL FIELD

The present invention relates to a power storage system that stores DC power for charging/discharging, and the invention is applicable for example to an electric rolling stock.

BACKGROUND ART

In recent years, it has been known to combine a drive control inverter provided in an electric rolling stock or a power supply facility provided in a substation on the ground or the like with a power storage system to which a power storage device such as a secondary battery and an electric double-layer capacitor is applied, so that excess regenerative power generated by braking a vehicle is stored in the power storage device and the stored power may efficiently be used for accelerating the vehicle or addressing drops in the line voltage, which enables efficient use of the kinetic energy of the vehicle (see for example Patent Documents 1 and 2).
Patent Document 1: JP-A-2003-199354
Patent Document 2: JP-A-2005-206111

SUMMARY OF THE INVENTION

Problems to be Solved by the Invention

When a power storage system is put to use, important and necessary techniques in using the power storage system in a stable and safe manner concern how to form the elements of the power storage system including their positional arrangement, how to operate the elements in connection with one another and under what condition, how to detect abnormalities in the power storage system if any, and how to operate the elements in consideration of the detection result.

However, applications and development of the power storage system have begun only in recent years, and although Patent Documents 1 and 2 briefly describe the configuration and operation of the power storage system, there is no disclosure about specific methods of operation when the power storage system is activated, operated, and stopped, abnormality detecting methods, and methods of operation when an abnormality is detected.

The present invention was made in view of the above-described circumstances, and it is an object of the invention to provide an optimum power storage system for application to a traction system or the like capable of surely carrying out activation, operation, and stopping that are important and necessary in actually using the power storage system and appropriately addressing various kinds of abnormalities.

Means for Solving the Problems

An aspect of the present invention is a power storage system comprising:
a DC-DC converter unit regulating DC power from a DC power supply into prescribed voltage and current; and
a power storage unit storing DC power regulated by the DC-DC converter,
wherein the power storage system, on the DC power supply side (the primary side) of the DC-DC converter, includes:
a primary side current detecting unit for detecting a current of a main circuit;
a primary side voltage detecting unit for detecting a voltage of the main circuit;
a primary side switch unit for opening and closing the main circuit; and
a primary side filter unit for reducing harmonics of the main circuit,
the power storage system, on the power storage unit side (the secondary side) of the DC-DC converter unit, includes:
a secondary side filter unit for reducing harmonics of the main circuit;
a secondary side switch unit for opening and closing the main circuit;
a secondary side voltage detecting unit for detecting a voltage of the main circuit; and
a secondary side current detecting unit for detecting a current of the main circuit, and
the power storage system includes a system control unit for controlling on/off states of at least the primary side switch unit, the secondary side switch unit and the DC-DC converter unit, inputted operational commands from outside of the power storage system and signals from the primary side current detecting unit, the primary side voltage detecting unit, the primary side switch unit, the primary side filter unit, the DC-DC converter unit, the secondary side filter unit, the secondary side switch unit, the secondary side voltage detecting unit, the secondary side current detecting unit and the power storage unit.

Advantages Of The Invention

In an aspect of the present invention, an optimum power storage system for application to a traction system or the like capable of surely carrying out activation, operation, and stopping and appropriately addressing various kinds of abnormalities can be implemented.

DETAILED DESCRIPTION OF THE INVENTION

First Embodiment

Figure 1:
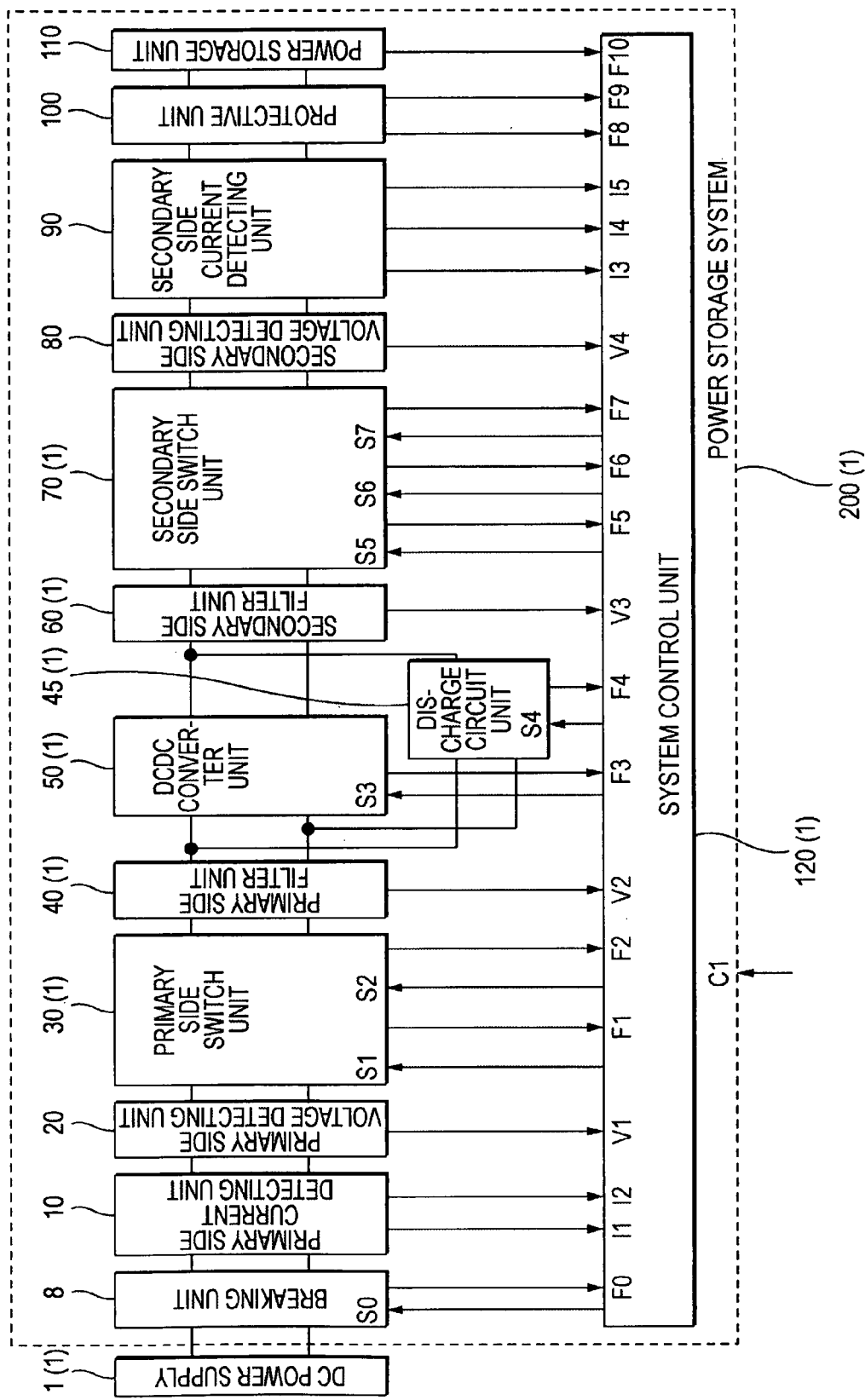
FIG. 1 is a diagram of an example of the configuration of a power storage system according to a first embodiment of the invention.

FIG. 1 is a diagram of the configuration of a power storage system according to a first embodiment of the invention.

As shown in FIG. 1, the power storage system 200(1) is connected to a DC power supply 1(1), and the power storage system 200(1) includes a breaking unit 8 that has current breaking means, a primary side current detecting unit 10 positioned in the succeeding stage of the breaking unit 8 to detect current at a primary side main circuit, a primary side voltage detecting unit 20 positioned in the succeeding state of the primary side current detecting unit 10 to detect voltage at the primary side main circuit, a primary side switch unit 30(1) positioned in the succeeding stage of the primary side voltage detecting unit 20 to open/close the primary side main circuit, a primary side filter unit 40(1) positioned in the succeeding stage of the primary side switch unit 30(1) to reduce harmonics at the primary side main circuit, a DC-DC converter unit 50(1) positioned in the succeeding stage of the primary filter unit 40(1), a secondary side filter unit 60(1) positioned on the secondary side of the DC-DC converter unit 50(1) to reduce harmonics at a secondary side main circuit, a discharge circuit unit 45(1) connected to the positive and negative sides of the primary side filter unit 40(1) and the positive side of the secondary side filter unit 60(1), a secondary side switch unit 70(1) positioned in the succeeding stage of the secondary side filter unit 60(1) to open/close the secondary side main circuit, a secondary side voltage detecting unit 80 positioned in the succeeding stage of the secondary side switch unit 70(1) to detect voltage at the secondary side main circuit, a secondary side current detecting unit 90 positioned in the succeeding stage of the secondary side voltage detecting unit 80 to detect current at the secondary side main circuit, a protective unit 100 positioned in the succeeding stage of the secondary side current detecting unit 90, a power storage unit 110 positioned in the succeeding stage of the protective unit 100, and a system control unit 120(1) that controls these elements.

The system control unit 120(1) outputs a closing command S0 to the breaking unit 8, closing commands S1 and S2 to the primary side switch unit 30(1), an operation command S3 to the DC-DC converter unit 50(1), a discharge command S4 to the discharge circuit unit 45(1), and closing commands S5 to S7 to the secondary side switch unit 70(1).

The system control unit 120(1) is provided with an auxiliary contact signal F0 from the breaking unit 8, primary side current I1 and primary side differential current I2 from the primary side current detecting unit 10, primary side voltage V1 from the primary side voltage detecting unit 20, auxiliary contact signals F1 and F2 from the primary side switch unit 30(1), primary side capacitor voltage V2 from the primary side filter unit 40(1), a status signal F3 from the DC-DC converter unit 50(1), a status signal F4 from the discharge circuit unit 45(1), secondary side capacitor voltage V3 from the secondary side filter unit 60(1), auxiliary contact signals F5 to F7 from the secondary side switch unit 70(1), secondary side voltage V4 from the secondary side voltage detecting unit 80, secondary side positive current I3, secondary side differential current I4, and secondary side negative side current I5 from the secondary side current detecting unit 90, auxiliary contact signals F8 and F9 from the protective unit 100, and a status signal F10 from the power storage unit 110. The system control unit 120(1) is provided with an externally applied operation command C1.

The above-described elements are supplied with a control power supply (not shown) from the side used for example to drive switches built in the primary side switch unit and the secondary side switch unit, have the DC-DC converter and the discharge circuit operated, and have the system control unit and a computer provided in a converter control unit (that will be described) operated.

Figure 2:
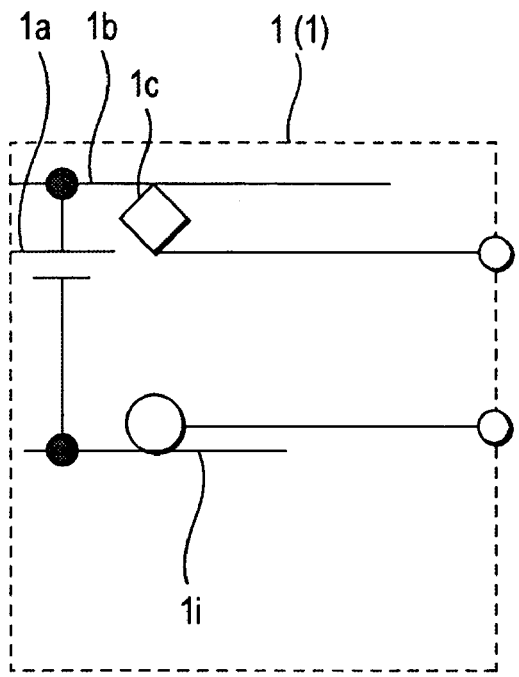
FIG. 2 is a diagram of an example of the configuration of a DC power supply 1(1) according to the first embodiment.

FIG. 2 is a diagram of an example of the configuration of a DC power supply 1(1) according to the first embodiment of the invention.

As shown in FIG. 2, the DC power supply 1(1) is voltage applied between a pantograph 1c and a rail 1i in a circuit including a DC voltage source 1a, an overhead contact line 1b, the pantograph 1c, and the rail 1i.

Figure 3:
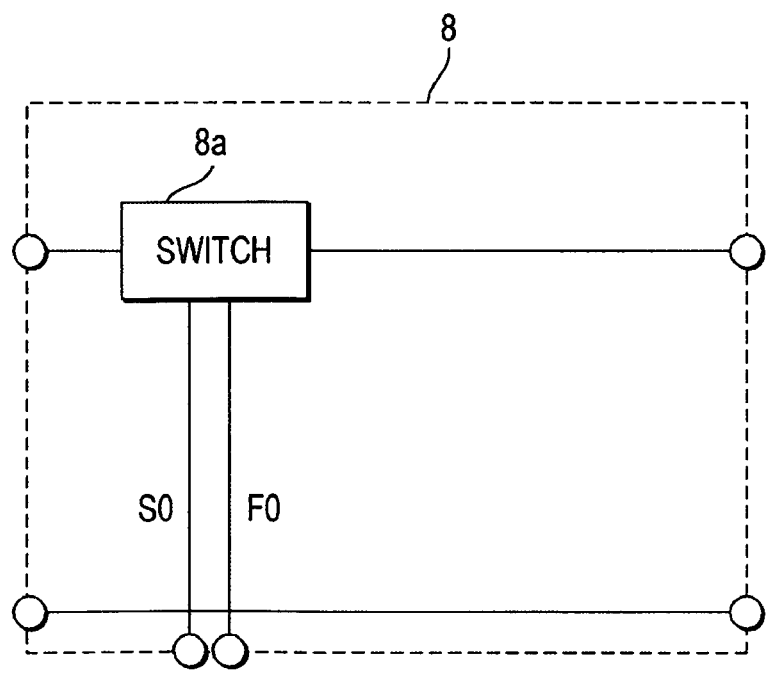
FIG. 3 is a diagram of an example of the configuration of a breaking unit 8 according to the first embodiment.

FIG. 3 is a diagram of an example of the configuration of the breaking unit 8 according to the first embodiment of the invention.

As shown in FIG. 3, the breaking unit 8 includes a switch 8a.

The switch 8a is a switch (so-called breaker) capable of automatically breaking a circuit without an externally applied command if excess current is passed.

Figure 4:
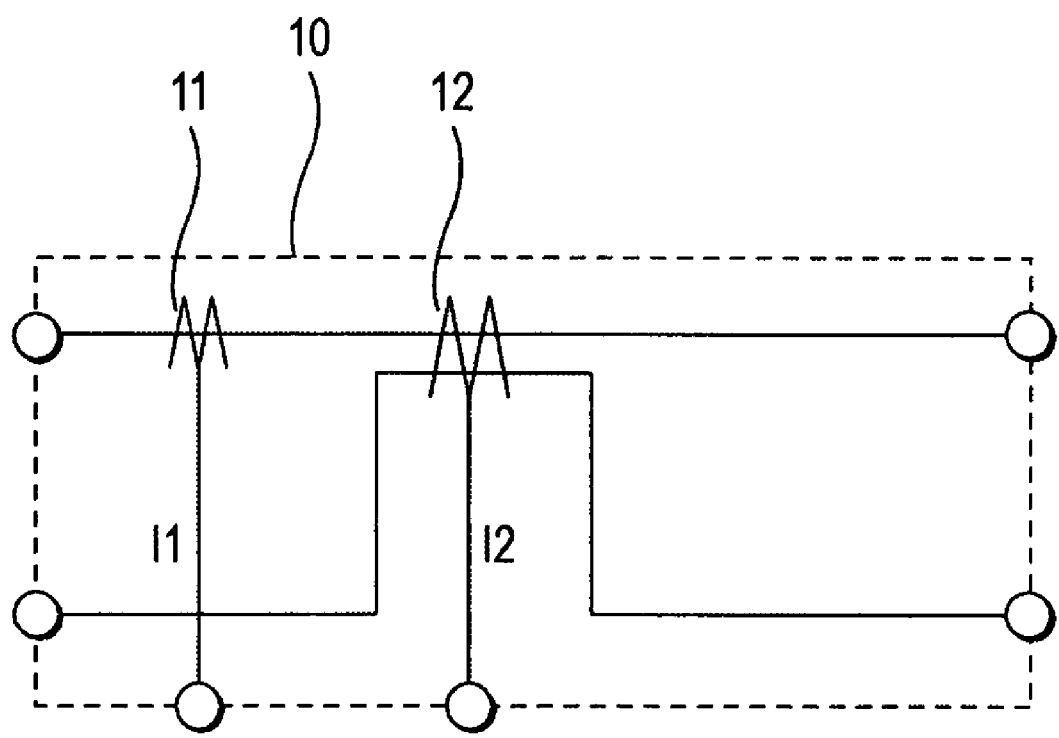
FIG. 4 is a diagram of an example of the configuration of a primary current detecting unit 10 according to the first embodiment.

FIG. 4 is a diagram of an example of the configuration of the primary side current detecting unit 10 according to the first embodiment of the invention.

The unit includes a current detector 11 that detects the primary side current I1 and a current detector 12 that detects the differential current I2 between the positive side and the negative side.

The current detectors both detect current by converting a flux generated by the current passing across each current detector into a current value, while they may have other structures.

The positive side line and the negative side line are penetrated through the current detector 12 in the manner in which their current directions are opposite to each other. When the circuit operates normally, the positive side current and the negative side current have equal magnitudes and directed in different directions, and therefore the sum of the fluxes generated by the positive current and the negative side current is zero, so that the current value detected by the current detector 12 is zero. However, once leakage current is generated because of degraded line insulation or the like, the current partly passes across a part other than the line such as the metal case of the device, which causes the positive side current and the negative side current to be different from each other in magnitude, the sum of the fluxes generated by the positive current and the negative side current penetrating through the current detector 12 is no longer zero, so that the output I2 of the current detector 12 is not zero.

The system control unit 120(1) can monitor the primary side differential current I2 to detect the leakage current.

The current leakage is caused by degraded line insulation or the like, which could give rise to a short circuit or a ground fault unless quick recovery is made. Current leakage is detected when it is still in a small amount and input to the system control unit 120(1) and appropriate measures that will be described are taken, so that a short circuit or a ground fault can be prevented.

The primary side current I1 and the secondary side differential current I2 detected by the current detectors 11 and 12 are output to the system control unit 120(1).

Note that the primary side current detecting unit 10 may be provided immediately after the breaking unit 8 (preceding the primary side voltage detecting unit 20), so that the differential current can be detected upstream of the circuit in view of the DC power supply 1(1), and the range of the circuit that can be detected for leakage current caused by voltage from the DC power supply 1(1) can be maximized.

Figure 5:
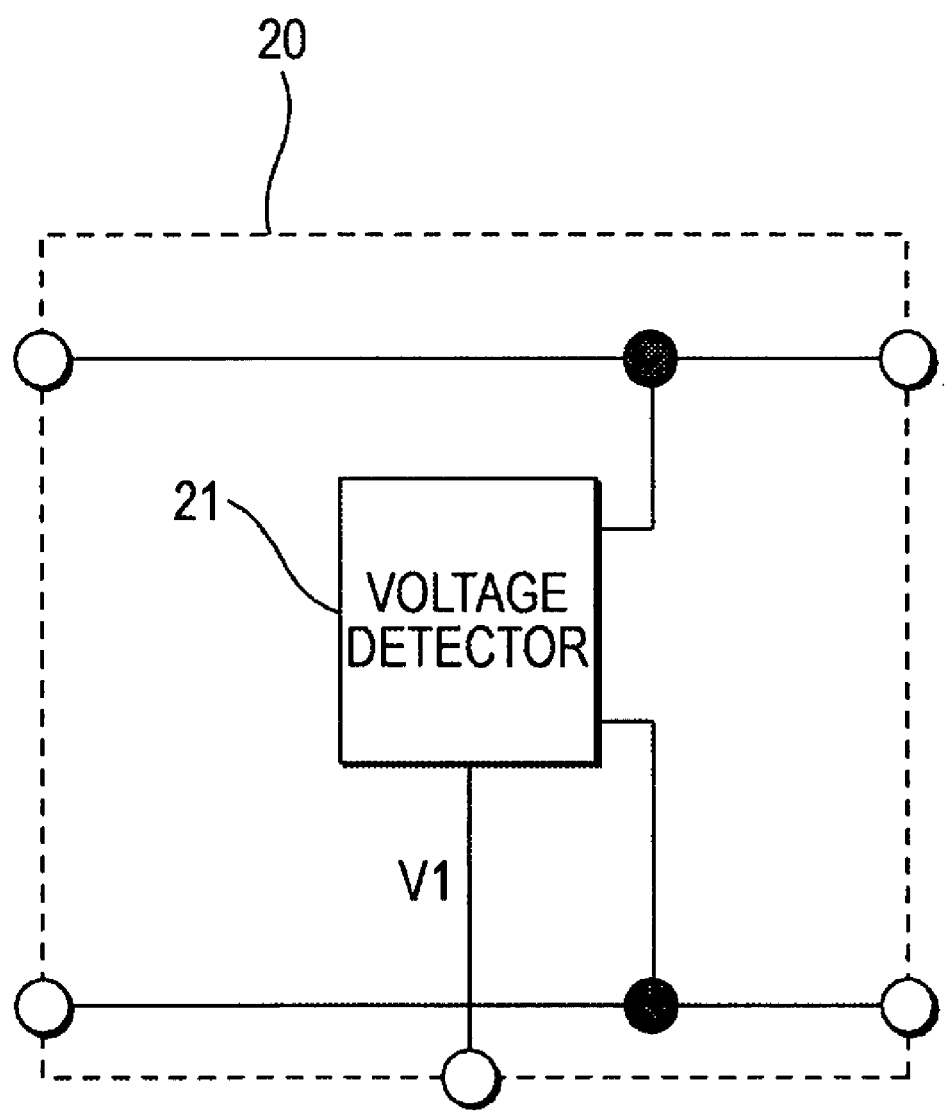
FIG. 5 is a diagram of an example of the configuration of a primary voltage detecting unit 20 according to the first embodiment.

FIG. 5 is a diagram of an example of the configuration of the primary side voltage detecting unit 20 according to the first embodiment of the invention.

As shown in FIG. 5, the primary side voltage detecting unit 20 includes a voltage detector 21 that detects the voltage between the positive side and the negative side. The detected primary side voltage V1 is output to the system control unit 120(1).

Figure 6:
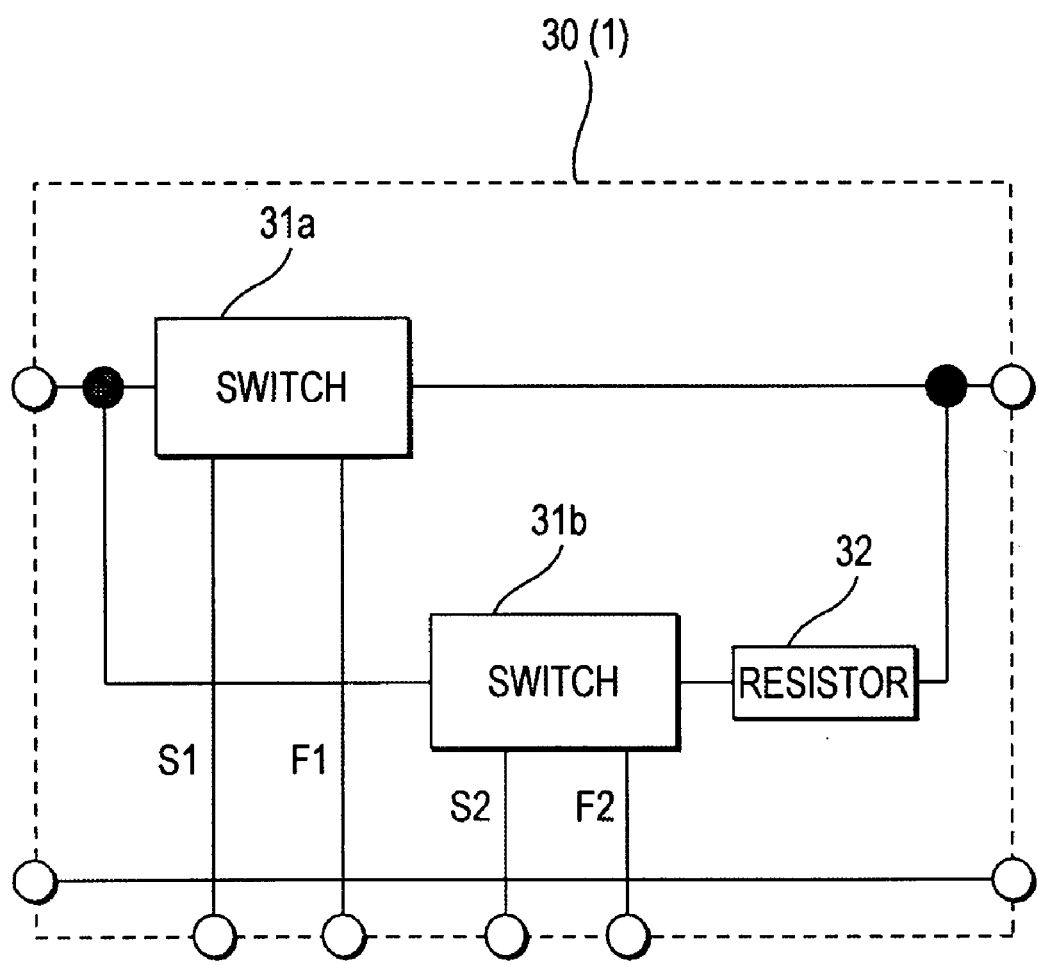
FIG. 6 is a diagram of an example of the configuration of a primary side switch unit 30(1) according to the first embodiment.

FIG. 6 is a diagram of an example of the configuration of the primary side switch unit 30(1) according to the first embodiment of the invention.

As shown in FIG. 6, the primary side switch unit 30(1) includes a switch 31a arranged in series with the positive side and a series circuit having a switch 31b and a charging resistor 32 arranged in parallel to the switch 31a. The switches 31a and 31b are provided with closing signals S1 and S2, respectively and auxiliary contact signals F1 and F2 (that will be described) are input from the switches 31a and 31b to the system control unit 120(1).

Figure 7:
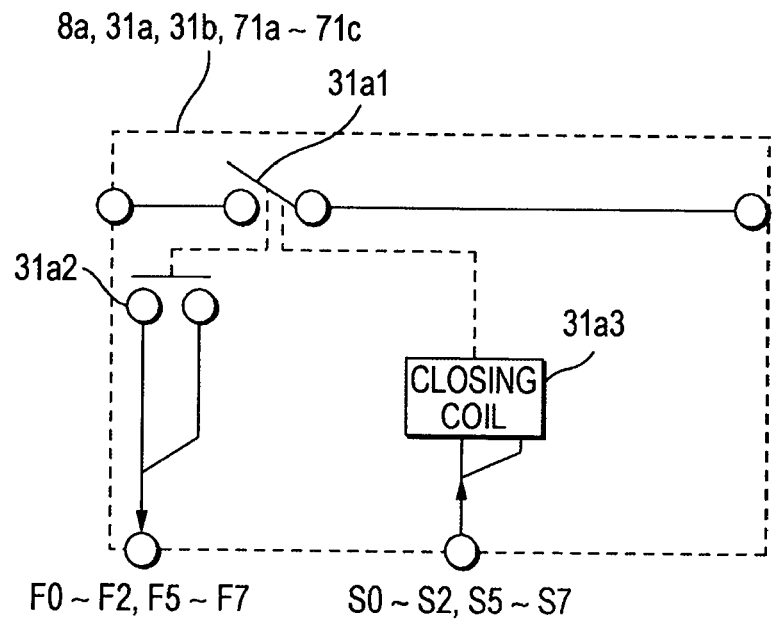
FIG. 7 is a diagram of an example of the configuration of switches according to the first to seventh embodiments.

FIG. 7 is a diagram of an example of the configuration of the switches 8a, 31a, 31b, and 71a to 71c according to the first embodiment of the invention. Note that the switches 71a to 71c will be described later.

As shown in FIG. 7, the configuration includes a main contact 31a1 that opens/closes the main circuit, a closing coil 31a3 that drives the main contact 31a1, and auxiliary contacts 31a2 mechanically connected to the main contact 31a1 to be closed/opened in response to the closing/opening of the main contact 31a1.

The closing coil 31a3 is a electromagnetic coil that is turned on/off in response to closing commands S0 to S2 and S5 to S7 input from the system control unit 120(1), and the main contact 31a1 is closed/opened in response to the presence/absence of the driving force of the coil.

The auxiliary contact signals F0 to F2 and F5 to F7 indicating the operation of the main contact 31a1 detected by the auxiliary contact 31a2 are output to the system control unit 120(1).

Note that in the above description, the switches 8a, 31a, 31b, and 71a to 71c are mechanical switches, but the switches may be other kinds of switches such as semiconductor type contactless switches as long as the opening and closing and the operation confirmation of the circuit can be carried out using them.

The auxiliary contact 31a2 is closed in response to the closing of the main contact 31a1 and opened in response to its opening. Conversely, the auxiliary contact may be opened/closed in response to the closing/opening of the main contact 31a1.

In this way, a signal from an auxiliary contact linked with the main contact is input to the system control unit 120(1), and the operation of the switch can surely be recognized by the system control unit, so that activation, operation, and stopping steps can be ensured, and abnormalities in the switches can be detected.

Figure 8:
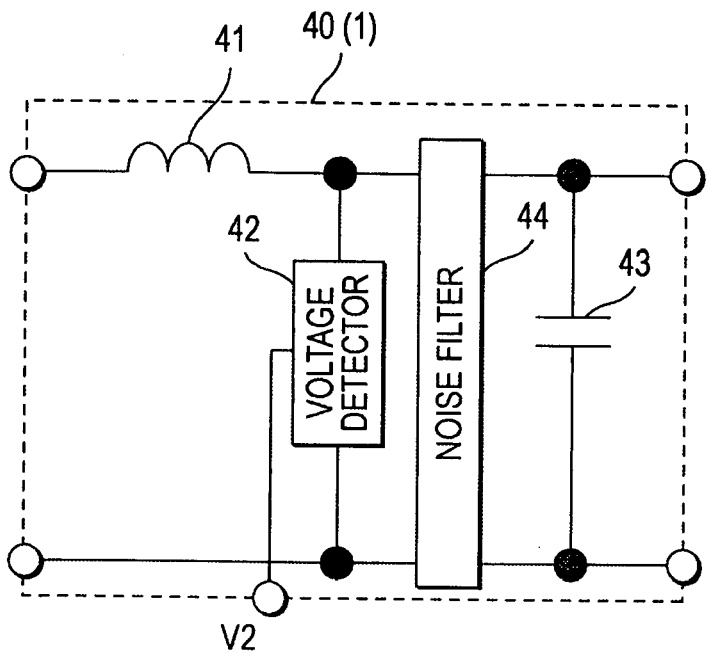
FIG. 8 is a diagram of an example of the configuration of a primary side filter unit 40(1) according to the first embodiment.

FIG. 8 is a diagram of an example of the configuration of the primary side filter unit 40(1) according to the first embodiment of the invention.

As shown in FIG. 8, a voltage detector 42 is connected in the succeeding stage of a reactor 41. Primary side capacitor voltage V2 detected by the voltage detector 42 is output to the system control unit 120(1).

A noise filter 44 is connected in the succeeding stage of the voltage detector 42, and a primary side capacitor 43 is connected in the succeeding stage of the noise filter 44.

The noise filter 44 generates impedance for noise components (common mode noise) flowing the positive side line and the negative side line in the same direction in order to reduce the noise from flowing to the outside and the filter can be implemented by arranging a ring-shaped core member made of a material such as ferrite and amorphous through the positive and negative side lines while the center of the core member is directed so that the current directions of these lines are opposite to each other.

In order to increase the impedance, the core member may be turned multiple times in the positive and negative side lines in the same direction.

The noise filter 44 is preferably provided preceding and near the primary side capacitor 43.

With the noise filter 44 provided in this way, a power storage system with less external noise flow can be provided.

A circuit (not shown) having two capacitors with a good high frequency characteristic connected in series may be connected to the primary side capacitor 43 in parallel, and the mid point in the series-connection may be grounded to the case, so that common mode noise flow can be reduced. If the arrangement is used together with the noise filter 44, the common mode noise can be reduced even more effectively.

Note that when the voltage detector 42 is connected in the succeeding stage of the noise filter 44, the noise filter 44 may function as impedance to common mode noise current generated by the DC-DC converter unit 50(1) (that will be described) connected in parallel in the succeeding stage of the primary side capacitor 43, and therefore the common mode noise current flows into the system control unit 120(1) through the voltage detector 42 whose impedance is relatively reduced, which could give rise to errors in the operation of the system control unit 120(1). The voltage detector 42 connected in the preceding stage of the noise filter 44 allows the common mode noise current generated from the DC-DC converter 50(1) to flow into the system control unit 120(1) through the voltage detector 42 and erroneous operation can be prevented.

Figure 9:
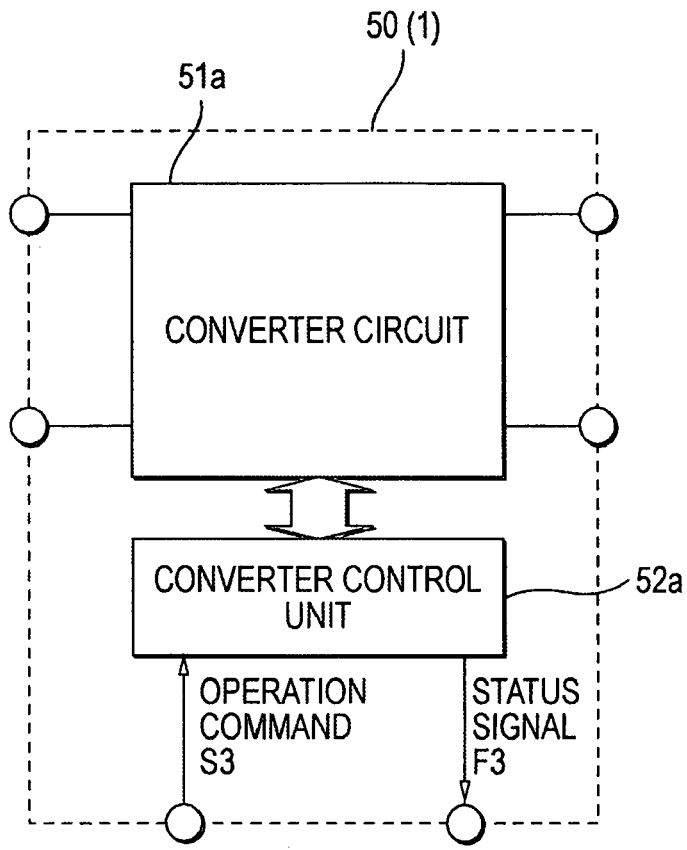
FIG. 9 is a diagram of an example of the configuration of a DC-DC converter unit 50(1) according to the first embodiment.

FIG. 9 is a diagram of an example of the configuration of the DC-DC converter unit 50(1) according to the first embodiment of the invention.

As shown in FIG. 9, the DC-DC converter unit 50(1) includes a converter circuit 51a and a converter control unit 52a, an operation command S3 is input from the system control unit 120(1) to the converter control unit 51a, and a status signal F3 is output from the converter control unit 52a to the system control unit 120(1).

Figure 10:
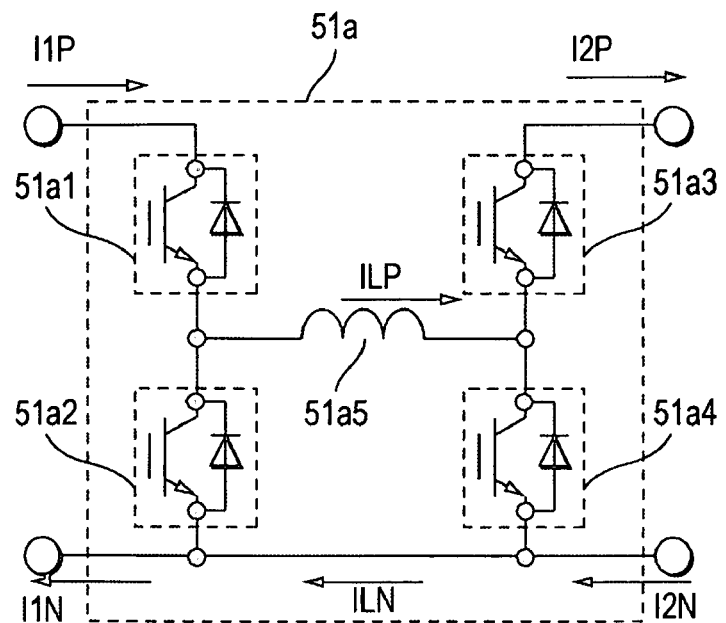
FIG. 10 is a diagram of an example of the configuration of a converter circuit 51a according to the first embodiment.

FIG. 10 is a diagram of an example of the configuration of the converter circuit 51a.

As shown in FIG. 10, the circuit includes a bidirectional buck-boost converter circuit including four switching elements 51a1 to 51a4 and a coupling reactor 51a5. The circuit is capable of controlling power flow in the two directions regardless of which is greater between the primary side voltage (at the left side terminal in the figure) and the secondary side voltage (at the right side terminal in the figure) in the converter circuit.

In this way, voltage at the power storage unit 110 can be set to a higher level than the voltage of the DC power supply 1a, and current in the circuits in and after the DC-DC converter unit 50(1) can be reduced accordingly, which allows the components to be reduced in size, so that a compact and lightweight power storage system can be obtained.

As shown in FIGS. 9 and 10, the converter control unit 52a is provided with an operation command S3 from the system control unit 120(1) and the command includes the operation, stopping, or control mode of the DC-DC converter, and command values (target values) for power to be passed between the primary side and the secondary side, coupling reactor current ILP (or ILN), converter primary side current I1P (or I1N), converter secondary side current I2P (or I2N), primary side capacitor voltage V2, and secondary side capacitor voltage V3. The status signal F3 of the DC-DC converter 50(1) is input from the converter control unit 52a to the system control unit 120(1).

The status signal F3 includes the voltage, current, and temperature of the elements, the on/off states and the failure state of the switching elements in the DC-DC converter 50(1). The converter control unit 52a carries out PWM control to the switching elements 51a1 to 51a4 of the converter circuit 51a in response to the operation command S3.

Figure 11:
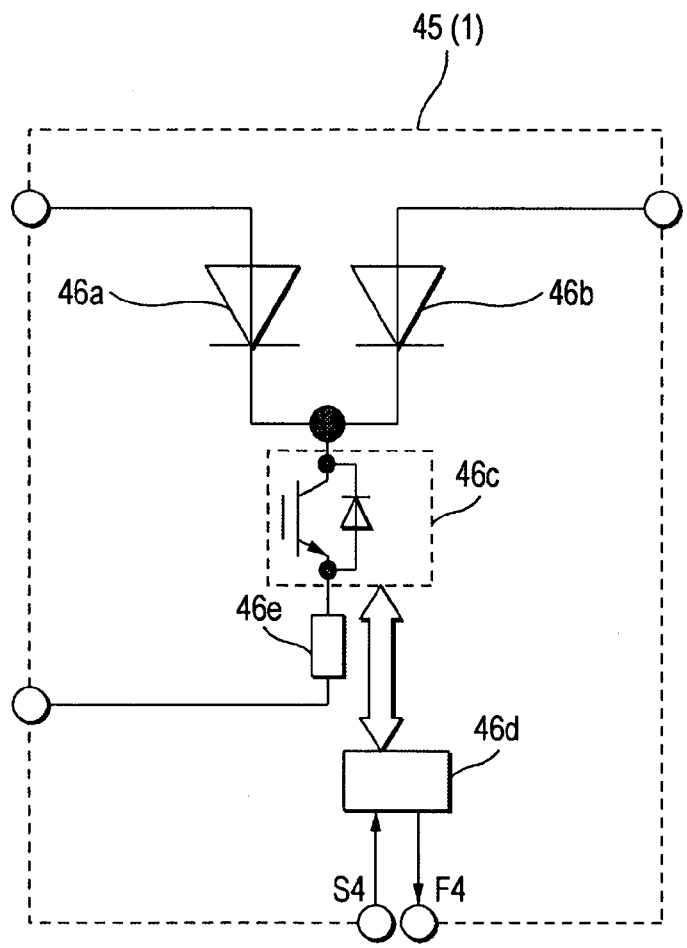
FIG. 11 is a diagram of an example of the configuration of a discharge circuit unit 45(1) according to the first embodiment.

FIG. 11 is a diagram of an example of the configuration of a discharge circuit unit 45(1) according to the first embodiment of the invention.

As shown in FIG. 11, a primary side diode 46a is connected to a line led from the positive side of the succeeding stage of the primary side filter unit 40(1), and a secondary side diode 46b is connected to a line led from the positive side of the preceding stage of the secondary side filter unit 60(1). The cathode sides of the diodes are butted against each other and the positive side of a circuit having a discharge element 46c and a discharging resistor 46e connected in series is connected to the butt point, while its negative side is connected to the negative side line.

The on/off state of the discharge element 46c is controlled by a discharge element driving circuit 46d. The discharge element driving circuit 46d is provided with a discharge command S4 including an on/off command for the discharge element 46c from the system control unit 120(1), and a status signal F4 including the operation state of the discharge element 46c is input from the discharge element driving circuit 46d to the system control unit 120(1).

In this way, the primary side diode 46a and the secondary side diode 46b are butted against each other, so that the primary and secondary side capacitors 43 and 63 can be discharged by the one discharge element 46c, so that a compact and lightweight discharge circuit unit can be provided.

Figure 12:
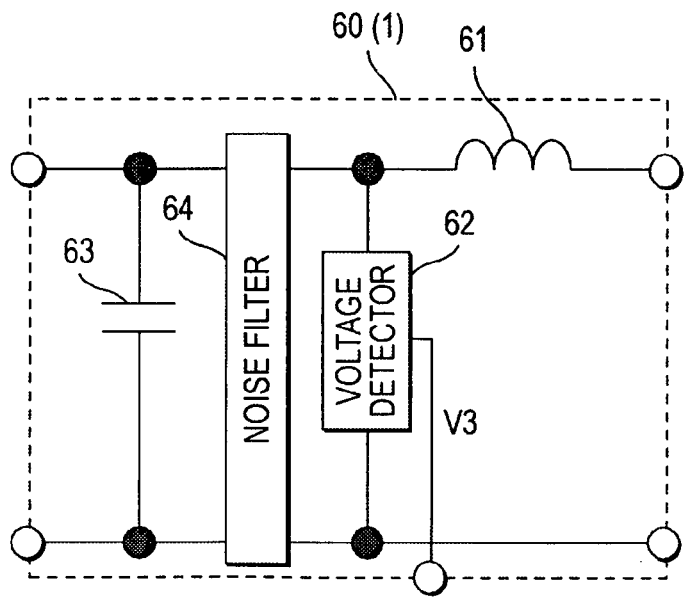
FIG. 12 is a diagram of an example of the configuration of a secondary filter unit 60(1) according to the first embodiment.

FIG. 12 is a diagram of an example of the configuration of the secondary filter unit 60(1) according to the first embodiment of the invention.

As shown in FIG. 12, a noise filter 64 is connected in the succeeding stage of the secondary side capacitor 63, and a voltage detector 62 that detects the secondary side capacitor voltage V3 is provided in the succeeding stage. The signal V3 detected by the voltage detector 62 is output to the system control unit 120. A reactor 61 is connected in the succeeding stage of the voltage detector 62.

The configuration of the noise filter 64 is the same as that of the noise filter 44 and therefore the description will not be provided.

The noise filter 64 is preferably provided succeeding and near the secondary side capacitor 63.

A circuit (not shown) having two capacitors with a good high frequency characteristic connected in series may be connected to the secondary side capacitor 63, and the mid point in the series-connection may be grounded to the case, so that common mode noise flow can be reduced. If the arrangement is used together with the noise filter 64, the common mode noise can be reduced even more effectively.

The reactor 61 is provided to reduce ripple current generated at the DC-DC converter unit 50(1).

Note that if the voltage detector 62 is connected in the preceding stage of the noise filter 64, the noise filter 64 serves as impedance to common mode noise current generated from the DC-DC converter unit 50(1) connected in parallel to the capacitor 63, so that the common mode noise current is allowed to flow into the system control unit 120(1) through the voltage detector 62 whose impedance is relatively reduced, which could give rise to errors in the operation of the system control unit 120(1). The voltage detector 62 connected in the succeeding stage of the noise filter 64 allows the common mode noise current generated from the DC-DC converter 50(1) to flow into the system control unit 120(1) through the voltage detector 62 and erroneous operation can be prevented.

Figure 13:
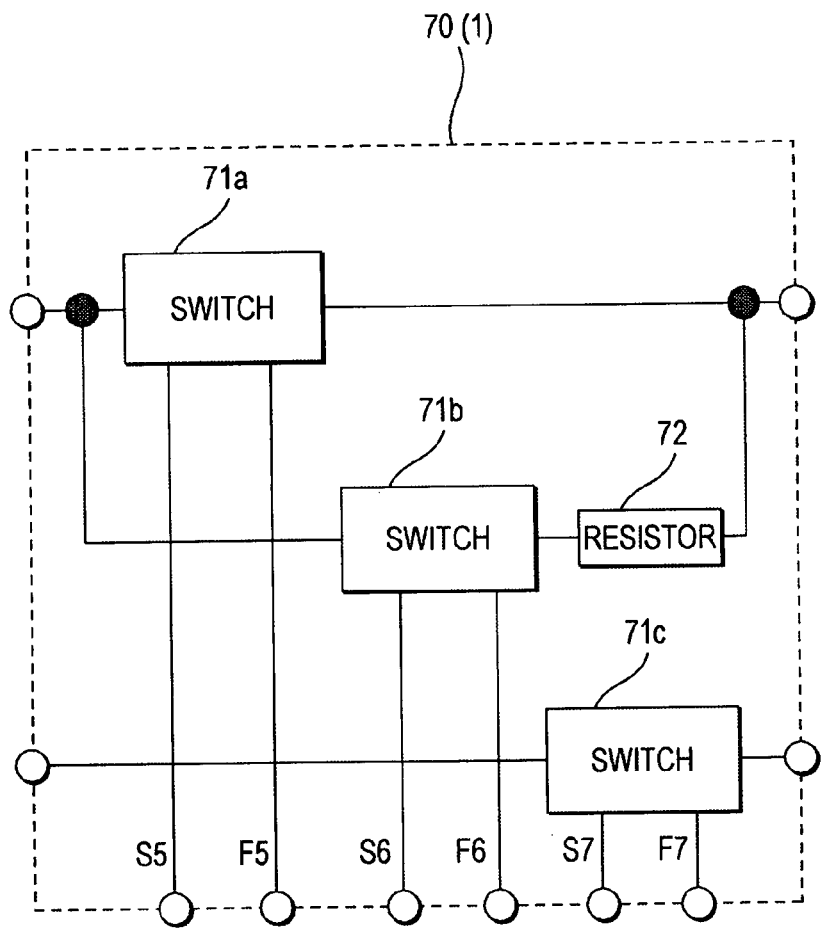
FIG. 13 is a diagram of an example of the configuration of a secondary side switch unit 70(1) according to the first embodiment.

FIG. 13 is a diagram of an example of the configuration of the secondary side switch unit 70(1) according to the first embodiment of the invention.

As shown in FIG. 13, the primary side switch unit 70(1) includes a switch 71a arranged in series with the positive side, a series-circuit having a switch 71b and a charging resistor 72 connected in parallel thereto, and a switch 71c arranged in series with the negative side.

Switches 71a to 71c are provided with closing signals S5 to S7 from the system control unit 120(1), and auxiliary contact signals F5 to F7 indicating the operation of the switches 71a to 71c are input from these switches to the system control unit 120(1).

The internal configuration of the switches 71a to 71c are the same as that shown in FIG. 7 and therefore the description will not be provided.

Note that the described switches 71a to 71c are mechanical switches, but the switches may be other kinds of switches such as semiconductor type contactless switches as long as the opening and closing and the operation confirmation of the circuit can be carried out using them.

Figure 14:
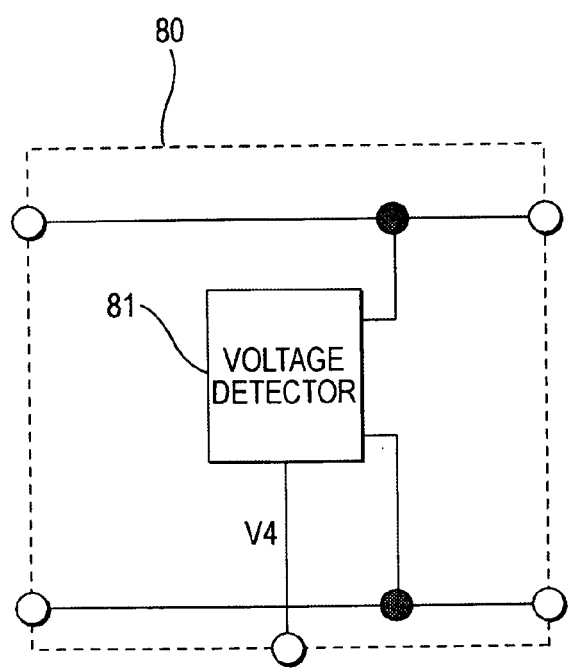
FIG. 14 is a diagram of an example of the configuration of a secondary side voltage detecting unit 80 according to the first embodiment.

FIG. 14 is a diagram of an example of the configuration of the secondary side voltage detecting unit 80 according to the first embodiment of the invention.

As shown in FIG. 14, the secondary side voltage detecting unit 80 is made of a voltage detector 81 that detects secondary side voltage V4. The detected signal V4 is output to the system control unit 120(1).

Figure 15:
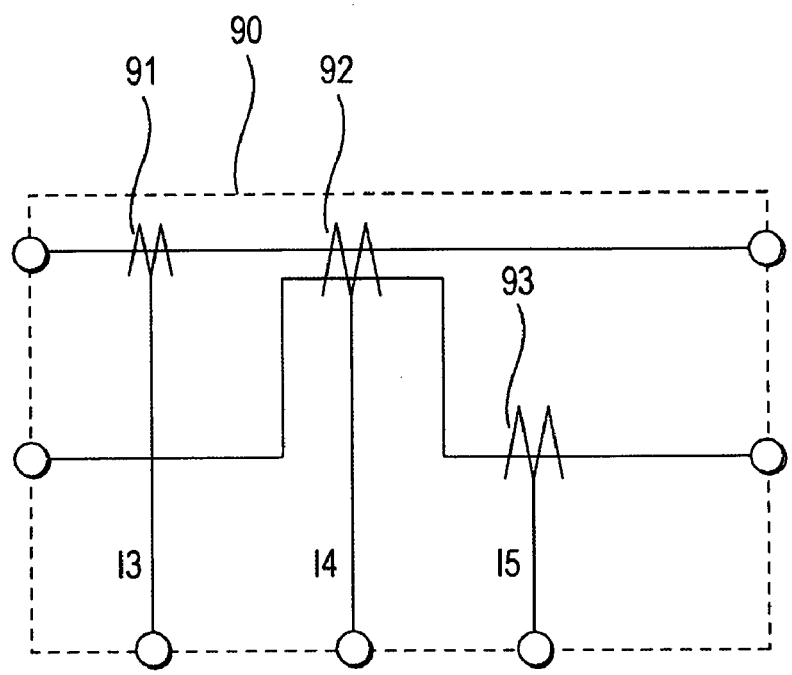
FIG. 15 is a diagram of an example of the configuration of a secondary side current detecting unit 90 according to the first embodiment.

FIG. 15 is a diagram of an example of the configuration of the secondary side current detecting unit 90 according to the first embodiment of the invention.

As shown in FIG. 15, the unit includes a current detector that detects positive side secondary current I3, a current detector 92 that detects the differential current I4 between the positive side and the negative side, and a current detector that detects negative side secondary side current I5.

These current detectors each operate by converting a flux generated by current passing through each current detector into a current value.

The current detector 92 is used to detect leakage current caused by circuit insulation degradation, details of which are the same as those of the current detector 12 and therefore the description will not be provided.

Note that the secondary side current detecting unit 90 may be provided immediately before the protective unit 100 (succeeding the secondary side voltage detecting unit 80), so that differential current in the immediate vicinity of the power storage unit 110 can be detected. Therefore, the differential current can be detected upstream of the circuit in view of the power storage unit 110, and the range of the circuit that can be detected for leakage current caused by voltage from the power storage unit 110 can be maximized.

The secondary side positive side current I3, the secondary side differential current I4, and the secondary side negative side current I5 detected by the current detectors 91 to 93 are output to the system control unit 120(1).

Note that without providing the current detector 92, only the signals I3 and I5 from the current detectors 91 and 92 may be input to the system control unit 120(1), where the difference between the signals may be operated for evaluation, and still the same advantages result.

Figure 16:
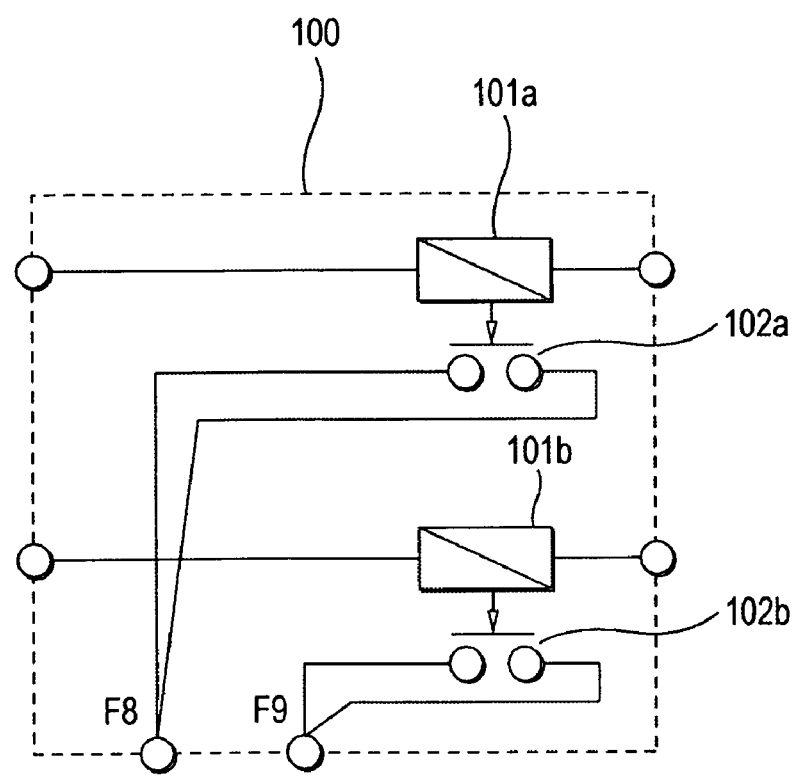
FIG. 16 is a diagram of an example of the configuration of a protective unit 100 according to the first embodiment.

FIG. 16 is a diagram of an example of the configuration of the protective unit 100 according to the first embodiment of the invention.

As shown in FIG. 16, the unit includes a positive side fuse 101a and a negative side fuse 101b, and opens the circuit by blowing in response to passage of excess current therethrough. The fuses have auxiliary contacts 102a and 102b for detecting fuse blowing as the contacts are closed by blowing.

Auxiliary contact signals F8 and F9 indicating the states of the auxiliary contacts 102a and 102b are output to the system control unit 120(1).

Note that the blowing may be detected when the fuses 101a and 101b are blown to open the contacts, and the auxiliary contacts may be detecting circuits made of an electronic circuit rather than the mechanical contacts.

A switch (so-called breaker) capable of automatically breaking the circuit in response to excess current without an externally applied command may be employed instead of the fuses.

With the fuse being provided on the negative side in addition to the one on the positive side, the circuit can be interrupted if the negative side line preceding the fuse 101b and the contacts of cells 111 in the power storage unit 110 short circuit, so that a power storage system with a higher protective function can be obtained.

Figure 17:
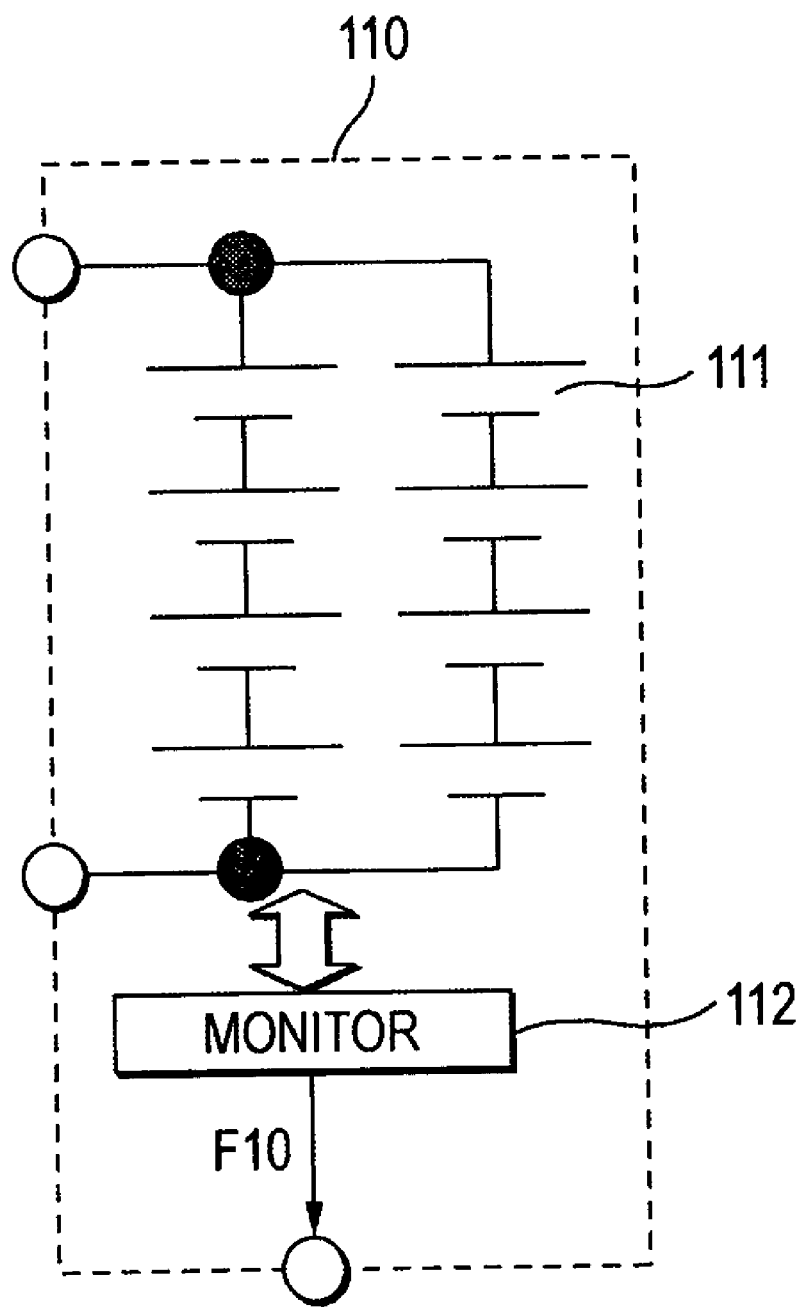
FIG. 17 is a diagram of an example of the configuration of a power storage unit 110 according to the first embodiment.

FIG. 17 is a diagram of an example of the configuration of the power storage unit 110 according to the first embodiment of the invention.

As shown in FIG. 17, a plurality of cells 111 each made of an electric double-layer capacitor or a secondary battery are provided in a series-parallel arrangement, so that necessary voltage and capacitance can be provided between the terminals of the power storage unit.

Various kinds of information such as the voltage, the current, the amount of stored power, the temperature, and the pressure of the cells 111 or the elements of the power storage unit 110 are collected by a power storage unit monitor 112 and output to the system control unit 120(1) as a status signal F10.

The operation steps from the activation through the steady state operation to the stopping of the power storage system 200(1) according to the first embodiment will be described.

Note that there may be two methods of activating the power storage system, one is to charge the primary side capacitor 43 or the secondary side capacitor 63 from the DC power supply 1a to activate and operate the system (which will hereinafter be referred to as "primary side activation"), and the other is to charge the primary side capacitor 43 or the secondary side capacitor 63 using energy stored in the power storage unit 110 to activate and operate the system (which will hereinafter be referred to as "secondary side activation").

Now, the operation steps in the primary side activation will be described first and then the operation steps in the secondary side activation will be described.

Primary Side Activation

Step 1A-1

If the control power supply for the system control unit 120(1) is turned on, and an operation command C1 including an activation command is input from the outside, a closing command S0 for the switch 8a is output, the coil 31a3 of the switch 8a is excited, and the main contact 31a1 is closed accordingly.

If the state in which the closing command S0 is on, the auxiliary contact 31a2 of the switch 8a is surely closed and the auxiliary contact signal F0 is on continues for a certain period, the system control unit 120(1) recognizes that the switch 8a has normally been turned on.

Step 2A-1

If the state in which the primary side voltage V1 detected by the voltage detector 21 is at a prescribed value or more continues for a certain period after the system control unit 120(1) determines the normal turning on of the switch 8a, the system control unit outputs a closing command S2, so that the coil 31a3 of the switch 31b is excited and the main contact 31a1 is closed accordingly. In this way, the primary side capacitor 43 is charged through the charging resistor 32.

The system control unit 120(1) determines the normal turning on of the switch 31b if the state in which the closing command S2 is on, the auxiliary contact 31a2 of the switch 31b is surely closed, and the auxiliary contact signal F2 is on continues for a certain period. Then, after a prescribed period or if the difference between the primary side voltage V1 and the secondary side capacitor voltage V2 is equal to or lower than a prescribed value and then a prescribed period elapses, the system control unit determines that the charging of the primary side capacitor 43 is complete, and outputs a closing command S1. In this way, the coil 31a3 of the switch 31a is excited and the main contact 31a1 is closed accordingly.

The system control unit 120(1) recognizes that the switch 31a has normally been turned on if the state in which the auxiliary contact 21a2 of the switch 31a is surely closed and the auxiliary contact signal F1 is on continues for a certain period.

Step 3A-1

Upon recognizing the normal closing of the switch 31a, the system control unit 120(1) outputs an operation command S3 to the converter control unit 52a. At the time, the command S3 includes an command to have the DC-DC converter 50(1) operated in an initial charging mode in order to charge the secondary side capacitor 63, the secondary side capacitor voltage V3, and the secondary side voltage V4. Upon receiving the operation command S3, the converter control unit 52a controls the converter circuit 51a so that the secondary side capacitor voltage V3 equals the secondary side voltage V4, and necessary power is passed from the primary side to the secondary side of the converter to charge the secondary side capacitor 63.

Note that in order to prevent the secondary side capacitor 63 or the like from being damaged by abrupt charging, the secondary side capacitor 63 is charged while the converter control unit 52a controls the current in the converter circuit 51a so that the current passed from the primary side to the secondary side is restricted to a prescribed value.

The system control unit 120(1) determines that the charging of the secondary side capacitor 63 is complete if the difference between the secondary side capacitor voltage V3 and the secondary side voltage V4 is equal to or lower than the prescribed value, and then a prescribed period has been elapsed.

Step 4A-1

Upon determining that the charging of the secondary side capacitor 63 is complete, the system control unit 120(1) turns on closing commands S5 and S7 that turn on the switches 71a and 71c. This drives the power coils 31a3 of the switches 71a and 71c, and the main contact 31a1 is closed accordingly. In this way, the auxiliary contact 31a2 liked to the main contact 31a1 is closed, and auxiliary contact signals F5 and F7 indicating the state of the auxiliary contacts 31a2 are output to the system control unit 120(1).

The system control unit 120(1) recognizes that the turning on of the switches 71a and 71c is complete if the state in which the closing commands S5 and S7 are on, the auxiliary contacts 31a2 of the switches 71a and 71c are surely closed and the auxiliary contact signals F5 and F7 are on continues for a certain period.

Note that the switches 71a and 71c may be turned on either simultaneously or sequentially. When they are sequentially turned on, the peak power necessary for turning them on may be reduced, and only the switch to be turned on last may serve as a switch capable of opening and closing current. A switch capable of opening and closing current is generally large in size, while the number of such switches may be reduced and therefore a compact and lightweight power storage system can be obtained.

Step 5A-1

Upon determining that the switches 71a and 71c has normally been turned on, the system control unit 120(1) outputs an operation command S3 to have the converter control unit 52a operated while keeping the current ILP (or the negative side current ILN) of the coupling reactor 51a5 at zero.

In this way, the converter control unit 52a controls the converter circuit 51a so that the current IL (or the negative side current ILN) of the coupling reactor 51a5 is at zero.

Note that the converter primary side current I1P (or I1N) may be controlled to be zero, the converter secondary side current I2P (or I2N) may be controlled to be zero, or the primary side current I1 detected by the current detector 11 or the secondary side positive side current I3 detected by the current detector 91 may be controlled to be zero. The secondary side negative side current I5 as the detection value of the current detector 93 may be zero instead of the current detector 91.

The system control unit 120(1) determines that the converter control unit 52a is normal if the state in which the detection value of the current to be controlled is a prescribed value or less continues for a certain period.

Step 6A-1

After determining that the converter control unit 52a is normal, the system control unit 120(1) inputs an operation command S3 including a current command I* or a power command P* to the converter control unit 52a.

In this way, the converter control unit 52a controls so that its current or the power between the primary side and the secondary side matches the command.

Note that the current to be controlled is one of the current ILP (or the negative side current ILN) of the coupling reactor 51a5, the converter primary side current I1P (or the negative side current I1N), and the converter secondary side current I2P (or I2N).

An operation command S3 including a voltage command V* may be input to the converter control unit 52a from the system control unit 120(1), and in this case the converter control unit 52a controls the converter circuit 51a so that a designated one of the primary side capacitor voltage V2 and the secondary side capacitor voltage V3 matches the voltage command V*.

Step 7A-1

Upon receiving an externally input operation command C1 including a stopping command, the system control unit 120 (1) inputs an operation command S3 to the converter control unit 52a to gradually reduce the converter current to zero.

The converter control unit 52a controls the converter circuit 51a to gradually reduce the current, eventually to zero.

The time required for reducing the current to zero can arbitrarily be set.

If the state in which the current is at a prescribed value or less continues for a certain period, the system control unit 120(1) inputs an operation command S3 to stop the DC-DC converter 50(1), and the converter control unit 52a turns off the switching elements 51a1 to 51a4 and outputs the state as a status signal F3.

The system control unit 120(1) determines that the DC-DC converter 50(1) has normally been stopped based on the status signal F3.

Note that the current to be controlled is one of the current ILP (or ILN) of the coupling reactor 51a5, the converter primary side current I1P (or the negative side current I1N), and the converter secondary side current I2P (or I2N).

In this way, the current is reduced to zero and then the switching elements 51a1 to 52a4 are turned off, so that the primary side capacitor voltage V2 or the secondary side capacitor voltage V3 can be prevented from abruptly changing and excess voltage or the like can be prevented.

Step 8A-1

Upon confirming that the DC-DC converter 50(1) has normally been stopped, the system control unit 120(1) turns off the closing commands S0, S1, S2, and S5 to S7 in order to open the switches 8a, 31a, 31b, and 71a to 71c.

The system control unit 120(1) confirms auxiliary contact signals F0 to F2 and F5 to F7 indicating the states of the auxiliary contacts 31a2 in the switches 8a, 31a, 31b, and 71a to 71c, and determines that the switches 8a, 31a, 31b, and 71a to 71c have normally been opened upon confirming that the switches are off.

In this way, the switches 8a, 31a, 31b, and 71a to 71c are opened based on the confirmation of the stopped state of the DC-DC converter 50(1), so that the switches 8a, 31a, 31b, and 71a to 71c can be opened with no current application, which prevents electrical wear of the main contacts in the switches 8a, 31a, 31b, and 71a to 71c.

Secondary Side Activation

Step 1B-1

If the control power supply for the system control unit 120(1) is turned on and an externally applied command C1 including an activation command is input, the system control unit 120(1) confirms a status signal F10 from the power storage unit monitor 112 in the power storage unit 110 and turns on closing commands S6 and S7 for the switches 71b and 71c provided that there is no abnormality and the state in which the secondary side voltage V4 detected by the voltage detector 81 is at a prescribed value or more continues for a certain period. In this way, the closing coils 31a3 of the switches 71b and 71c are driven, and the main contacts 31a1 are closed. This causes the auxiliary contacts 31a2 linked with the main contacts 31a1 to be closed, and auxiliary contact signals F6 and F7 indicating the states of the auxiliary contacts 31a2 are output to the system control unit 120(1).

The system control unit 120(1) recognizes the normal turning on of the switches 71b and 71c if the state in which the closing commands S6 and S7 are on, the auxiliary contacts 31a2 of the switches 71b and 71c are surely closed and the auxiliary contact signals F6 and F7 are on continues for a certain period.

Note that the switches 71b and 71c may be turned on either simultaneously or sequentially. When they are sequentially turned on, the peak power necessary for turning them on can be reduced, and therefore a control power supply with only a small peak withstand voltage may be employed, so that a compact and lightweight power storage system can be obtained.

The switches 71b and 71c are turned on, so that the secondary side capacitor 63 is charged through the charging resistor 72.

The system control unit 120(1) recognizes that the switches 71b and 71c have normally been turned on, then determines that the secondary side capacitor 63 has been charged and outputs an closing command S5 if the state continues for a certain period or if the difference between the secondary side voltage V4 and the secondary side capacitor V3 is a prescribed value or less and then a prescribed period elapses. In this way, the coil 31a3 of the switch 71a is excited and the main contact 31a1 is closed accordingly.

The system control unit 120(1) recognizes that the switch 71a has normally been turned on if the state in which the auxiliary contact 31a2 of the switch 71a is surely closed and the auxiliary contact signal F5 is on continues for a certain period.

Step 2B-1

Upon confirming that the switch 71a has normally been turned on, the system control unit 120(1) outputs an operation command S3 to the converter control unit 52a. At the time, the command S3 includes a command to have the DC-DC converter 50(1) operated in an initial charging mode in order to charge the primary side capacitor 43, the primary side capacitor voltage V2, and the primary side voltage V1. Upon receiving the operation command S3, the converter control unit 52a has the converter circuit 51a operated so that necessary power is passed from the secondary side to the primary side and the primary side capacitor 43 is charged.

Note that in order to prevent the primary side capacitor 43 or the like from being damaged by abrupt charging, the primary side capacitor 43 is charged while the converter control unit 52a controls current in the converter circuit 51a so that the current passed from the secondary side to the primary side is restricted to a prescribed value.

The converter control unit 52a controls the converter circuit 51a so that the primary side capacitor voltage V2 is equal to the primary side voltage V1 or the primary side capacitor voltage V2 is equal to a predetermined value.

The system control unit 120(1) determines the charging of the primary side capacitor 43 is complete if the difference between the primary side capacitor voltage V2 and the primary side voltage V1 is a prescribed value or less and then a prescribed period elapses or if the primary side capacitor voltage V2 reaches the predetermined prescribed value.

Step 3B-1

Upon determining that the charging of the primary side capacitor 43 is complete, the system control unit 120(1) turns on the closing command S1 to turn on the switch 31a. This drives the closing coil 31a3 of the switch 31a and the main contact 31a1 is closed. Then, the auxiliary contact 31a2 linked with the main contact 31a1 is closed, so that the auxiliary contact signal F1 indicating the state of the auxiliary contact 31a2 is output to the system control unit 120(1).

The system control unit 120(1) recognizes the normal turning on of the switch 31a if the state in which the closing command S1 is on, the auxiliary contact 31a2 of the switch 31a is surely closed and the auxiliary contact signal F1 is on continues for a certain period.

Step 4B-1

The system control unit 120(1) recognizes the normal turning on of the switch 31a, then outputs a closing command S0 for the switch 8a, excites the coil 31a3 of the switch 8a, and closes the main contact 31a1. The system control unit 120(1) recognizes the normal turning on of the switch 8a if the state in which the closing command S0 is on and the auxiliary contact 31a2 of the switch 8a is surely closed to turn on the auxiliary contact signal F0 continues for a certain period.

Step 5B-1

Upon determining that the switch 8a has normally been turned on, the system control unit 120(1) outputs an operation command S3 to have the converter control unit 52a operated so that the current ILP (or the negative side current ILN) of the coupling reactor 51a5 is at zero.

In this way, the converter control unit 52a has the converter circuit 51a operated so that the current ILP (or the negative side current ILN) of the coupling reactor 51a5 is at zero.

Note that the control can be carried out so that the converter primary side current I1P (or I1N) becomes zero, the converter secondary side current I2P (or I2N) becomes zero, or the primary side current I1 detected by the current detector 11 or the secondary side positive side current I3 detected by the current detector 91 becomes zero.

Note that the secondary side negative side current I5 as the detection value of the current detector 93 may become zero instead of the secondary side positive side current I3.

The system control unit 120(1) determines that the converter control unit 52a is normal if the state in which the detection value for the current to be controlled is a prescribed value or less for a prescribed period.

Step 6B-1

Upon determining that the converter control unit 52a is normal, the system control unit 120(1) inputs an operation command S3 including a current command I* or a power command P* to the converter control unit 52a.

In this way, the converter control unit 52a controls its current or the power between the primary side and the secondary side to mach the command.

Note that the current to be controlled is one of the current ILP (or the negative side current ILN) of the coupling reactor 51a5, the converter primary side current I1P (or I1N), and the converter secondary current I2P (or I2N).

An operation command S3 including a voltage command V* may be input to the converter control unit 52a from the system control unit 120(1), and the converter control unit 52a controls the converter circuit 51a so that a designated one of the primary side capacitor voltage V2 and the secondary side capacitor voltage V3 matches the voltage command V*.

Step 7B-1

The system control unit 120(1) inputs an operation command S3 to the converter control unit 52a so that the converter current is gradually reduced to zero if an externally applied operation command C1 including a stopping command is input.

The converter control unit 52a controls the converter circuit 51a to gradually reduce the current, eventually to zero. The time necessary for reducing the current to zero can arbitrarily be set. If the state in which the current is at a prescribed value or less continues for a certain period, the system control unit 120(1) inputs an operation command S3 to stop the DC-DC converter 50(1), and the converter control unit 52a turns off the switching elements 51a1 to 51a4 and outputs the state as a status signal F3. The system control unit 120(1) confirms that the DC-DC converter 50(1) has normally been stopped based on the status signal F3.

Note that the current to be controlled is one of the current ILP (or the negative side current ILN) of the coupling reactor 51a5, the converter primary side current I1P (or I1N), and the converter secondary side current I2P (or I2N).

In this way, the current is reduced to zero and then the switching elements 51a1 to 51a4 are turned off, so that the primary side capacitor voltage V2 or the secondary side capacitor voltage V3 can be prevented from abruptly changing and excess voltage or the like can be prevented.

Step 8B-1

Upon determining that the DC-DC converter 50(1) has normally been stopped, the system control unit 120(1) turns off the closing commands S0 to S2 and S5 to S7 to have the switches 8a, 31a, 31b, and 71a to 71c opened.

Upon confirming that the switches 8a, 31a, 31b, and 71a to 71c are surely off based on the auxiliary contact signals F0 to F2 and F5 to F7 that indicate the states of the auxiliary contacts 31a2 of these switches, the system control unit 120 (1) determines that the switches 8a, 31a, 31b, and 71a to 71c have normally been opened.

In this way, the switches 8a, 31a, 31b, and 71a to 71c are opened after it is confirmed that the DC-DC converter 50(1) is stopped, so that the switches 8a, 31a, 31b, and 71a to 71c can be opened with no current application, and therefore electrical wear of the main contacts of these switches 8a, 31a, 31b, and 71a to 71c can be prevented.

By the operation steps described above from the activation through the steady state operation to the stopping, a power storage system capable of reliable operation can be obtained.

Note that if only the operation by the primary side activation is necessary, the switch 71b of the secondary side switch unit 70(1) and the charging resistor 72 are not necessary and may be removed.

Meanwhile, if only the operation by the secondary side activation is necessary, the switch 31b of the secondary side switch unit 30(1) and the charging resistor 32 are not necessary and may be removed.

Now, a method of detecting abnormalities and operation to be carried out upon detecting an abnormality in the power storage system according to the first embodiment will be described in detail.

In order to allow the power storage system to operate in a safe and stable manner, appropriate measures must be taken quickly in response to the kind of an abnormality in each element of the power storage system. Therefore, a method of detecting abnormalities and measures to address the kinds of the abnormalities that are crucial will be described.

Abnormality Detection 1-1

Differential Current Abnormality Detection

If the state in which the primary side differential current I2 or the secondary side differential current I4 as the output of the current detector 12 or 92 is more than a prescribed value continues for a certain period, the system control unit 120(1) determines that there is increase in leakage current caused by insulation degradation somewhere in the circuit, turns off the closing signals S0 to S2 and S5 to S7 for the switches 8a, 31a, 31b, and 71a to 71c, turns off the switching elements 51a1 to 51a4 of the DC-DC converter 50(1), and inputs a discharge command S4 to the discharge circuit unit 45(1) so that the primary side capacitor 43 and the secondary side capacitor 63 are discharged.

The above-described operation allows the increase in leakage current to be detected and the power storage system to be quickly stopped, so that further damages can be prevented.

Note that such prescribed values may be provided in a plurality of stages, and if the differential current is sufficiently insignificant, the value may be recorded by a storage device (not shown) or indicated by an indicator lamp (not shown) in the system control unit, the device, the driver's seat or the like for encouraging checking without stopping the power storage system.

Abnormality Detection 2-1

Switch Abnormality Detection

The system control unit 120(1) determines that the switch 8a has an abnormality if the state continues for a certain period in which the main contact 31a1 is not closed for a failure in the closing coil 31a3 of the switch 8a or the like though the closing command S0 for the switch 8a is on, the auxiliary contact 31a2 is not closed accordingly, and the auxiliary contact signal F0 is not turned on or if the state continues for a certain period in which the closing command S0 is off while the auxiliary contact 31a2 is on and the auxiliary contact signal F0 is on.

Note that abnormalities are detected for the switches 31a, 31b, and 71a to 71c by the same method. If an abnormality is detected in any of the switches 8a, 31a, 31b, and 71a to 71c, the system control unit 120(1) turns off the closing commands S0 to S2 and S5 to S7 for all the switches 8a, 31a, 31b, and 71a to 71c, turns off the switching elements 51a1 to 51a4 of the DC-DC converter 50(1), and inputs a discharge command S4 to the discharge circuit unit 45(1), so that the primary side capacitor 43 and the secondary side capacitor 63 are discharged.

In this way, a failure in the switch is detected and the power storage system can quickly be stopped, so that further damages can be prevented.

Abnormality Detection 3-1

Primary Side Capacitor Charging Abnormality Detection (in Primary Side Activation)

Upon determining that the switch 31b has normally been turned on in the above-described step 2A-1 in the primary side activation, the system control unit 120(1) determines that charging cannot be completed because of an abnormality such as a ground fault in the primary side capacitor 43 if the difference between the primary side voltage V1 and the primary side capacitor voltage V2 is a prescribed value or higher after a prescribed period or if the primary side current I1 is passed in an amount equal to or higher than a prescribed value. Then, the system turns off the closing command S0 to S2 for the switches 8a, 31a, and 31b that have been turned on by the time, and inputs a discharge command S4 to the discharge circuit unit 45(1) to discharge the primary side capacitor 43.

By the operation described above, an abnormality in the charging circuit for the primary side capacitor 43 can be detected, so that the power storage system can quickly be stopped, and further damages can be prevented.

Abnormality Detection 4-1

Secondary Side Capacitor Charging Abnormality Detection (in Primary Side Activation)

The system control unit 120(1) determines that there is an abnormality in the DC-DC converter 50(1) or in the periphery of the secondary side capacitor 63 in step 3A-1 described above in the primary side activation if the charging of the secondary side capacitor 63 is not complete within a prescribed period or a status signal F3 indicating a failure in the converter is received from the converter control unit 52a. The system control unit then turns off the closing commands S0 to S2 for the switches 8a, 31a and 31b that have been turned on by the time, stops the switching elements 51a1 to 51a4 of the DC-DC converter 50(1), inputs a discharge command S4 to the discharge circuit unit 45(1) and discharges the primary side capacitor 43 and the secondary side capacitor 63.

By the above-described operation, an abnormality in the charging circuit for the secondary side capacitor 63 can be detected, so that the power storage system can quickly be stopped, and further damages can be prevented.

Abnormality Detection 5-1

Secondary Side Capacitor Charging Abnormality Detection (in Secondary Side Activation)

After determining that the switches 71b and 71c have normally been turned on in the above-described step 1B-1 in the secondary side activation, the system control unit 120(1) determines that charging cannot be completed because of an abnormality in the secondary side capacitor 63 or the like if the difference between the secondary side voltage V4 and the secondary side capacitor voltage V3 is a prescribed value or higher or if the secondary side positive side current I3 and the secondary side negative side current I4 are passed in an amount equal to or higher than a prescribed value. The system control unit then turns off the closing commands S6 to S7 for the switches 71b and 71c that have been turned on by then, inputs a discharge command S4 to the discharge circuit unit 45(1) and discharges the secondary side capacitor 63.

By the above-described operation, an abnormality in the charging circuit for the secondary side capacitor 63 can be detected, so that the power storage system can quickly be stopped, and further damages can be prevented.

Abnormality Detection 6-1

Primary Side Capacitor Charging Abnormality Detection (in Secondary Side Activation)

The system control unit 120(1) determines that there is an abnormality in the DC-DC converter 50(1) or in the periphery of the primary side capacitor 43 if charging to the primary side capacitor 43 is not complete within a prescribed period or if a status signal F3 indicating a failure in the converter is received from the converter control unit 52a in step 2B-1 in the secondary side activation. The system control unit then turns off the closing commands S6 and S7 for the switches 71b and 71c that have been turned on by then, stops the switching elements 51a1 to 51a4 in the DC-DC converter 50(1), inputs a discharge command S4 to the discharge circuit unit 45(1) and discharges the primary side capacitor 43 and the secondary side capacitor 63.

By the above-described operation, an abnormality in the charging circuit for the primary side capacitor 43 can be detected, so that the power storage system can quickly be stopped and further damages can be prevented.

Abnormality Detection 7-1

Primary Side Capacitor Excess voltage Detection

If the primary side capacitor voltage V2 detected by the voltage detector 42 exceeds a prescribed value, the system control unit 120(1) stops the switching elements 51a1 to 51a4 in the DC-DC converter 50(1), turns off the closing commands S1, S2, and S5 to S7 for the switches 31a, 31b, and 71a to 71c, inputs a discharge command S4 to the discharge circuit unit 45(1) and discharges the primary side capacitor 43 and the secondary side capacitor 63.

By the above-described operation, excess voltage for the primary side capacitor voltage V2 can be detected, so that the power storage system can quickly be stopped, and further damages can be prevented.

Abnormality Detection 8-1

Secondary Side Capacitor Excess Voltage Detection

If the secondary side capacitor voltage V3 detected by the voltage detector 62 exceeds a prescribed value, the system control unit 120(1) stops the switching elements 51a1 to 51a4 of the DC-DC converter 50(1), turns off closing commands S1, S2, and S5 to S7 for the switches 31a, 31b, and 71a to 71c, inputs a discharge command S4 to the discharge circuit unit 45(1) and discharges the primary side capacitor 43 and the secondary side capacitor 63.

By the above-described operation, excess voltage for the secondary side capacitor voltage V3 can be detected, so that the power storage system can quickly be stopped, and further damages can be prevented Abnormality Detection 9-1

DC-DC Converter Excess Current Detection

The system control unit 120(1) turns off the switching elements 51a1 to 51a4 in the DC-DC converter 50(1) if current at the switching elements 51a1 to 51a4 of the converter circuit 51a is at a prescribed value or higher.

Note that the switching elements 51a1 to 51a4 may be turned off if the current ILP or the negative side current ILN of the coupling reactor 51a5 is at a prescribed value or higher instead of the current at the switching elements 51a1 to 51a4.

Note that the closing commands S1, S2, and S5 to S7 for the switches 31a, 31b, and 71a to 71c are not turned off, a discharge command S4 is not input to the discharge circuit 45(1), and the primary side capacitor 43 and the secondary side capacitor 63 are not discharged.

The capacitors are not discharged, and only the switching elements 51a1 to 51a4 are turned off because excess current in the DC-DC converter could be generated temporarily by disturbance caused by abrupt change in the primary side capacitor voltage V2 or the secondary side capacitor voltage V3 and the phenomenon is not directly attributable to an abnormality in the DC-DC converter itself. There is little possibility for the DC-DC converter to be damaged.

By the above-described operation, excess current in the DC-DC converter can be detected, so that the power storage system can quickly be stopped and further damages can be prevented.

Furthermore, the time required for re-activation by recharging the capacitors can be shortened.

Abnormality Detection 10-1

DC-DC Converter Temperature Abnormality Detection

The system control unit 120(1) turns off the switching elements 51a1 to 51a4 if the surface temperature of the switching elements 51a1 to 51a4 in the converter circuit 51a or the temperature of a cooling fin (not shown) to which the switching elements 51a1 to 51a4 are attached is a set temperature or higher.

Note that the closing commands S1, S2, and S5 to S7 for the switches 31a, 31b, and 71a to 71c are not turned off, a discharge command S4 is not input to the discharge circuit 45(1), and the primary side capacitor 43 and the secondary side capacitor 63 are not discharged.

The capacitors are not discharged and only the switching elements 51a1 to 51a4 are turned off because a temperature rise in the DC-DC converter could be caused by temporary overload and the phenomenon is not directly attributable to an abnormality in the DC-DC converter itself. There is little possibility for the DC-DC converter to be damaged.

Note that another prescribed value lower than the prescribed value may be provided and if this lower prescribed value is exceeded, the current at the DC-DC converter may be controlled to be reduced so that the temperature rise is reduced. Then, if the previous prescribed value is still exceeded, the switching elements 51a1 to 51a4 may be turned off. This is preferable because the operation can be continued as long as possible.

By the above-described operation, a temperature abnormality in the DC-DC converter can be detected, so that the power storage system can quickly be stopped and further damages can be prevented.

Furthermore, the time required for re-activation by recharging the capacitors can be shortened.

Abnormality Detection 11-1

Switching Element Abnormality Detection

If an abnormality in any of the switching elements 51a1 to 51a4 (the content of which will be detailed) in the converter circuit 51a is detected by a detecting circuit (not shown) built in each of the switching elements 51a1 to 51a4, a driving circuit (not shown) in each of the switching elements 51a1 to 51a4 or the converter control unit 52a, the system control unit 120(1) recognizes the state based on a status signal F3, then stops the switching elements 51a1 to 51a4 in the DC-DC converter 50(1), turns off the closing commands S0, S1, S2, and S5 to S7 for the switches 8a, 31a, 31b, and 71a to 71c, inputs a discharge command S4 to the discharge circuit unit 45(1) and discharges the primary side capacitor 43 and the secondary side capacitor 63.

Note that if the built-in detecting circuits (not shown) detects an abnormality, the switching elements 51a1 to 51a4 may independently turn off without a turn-off command from the system control unit 120(1) or the converter control unit 52a. A switching element having such a function has been commercially available and referred to as an intelligent power module. In this way, the switching-off may be carried out more quickly without a lag from the moment of abnormality detection, which improves the protective performance.

The above-described abnormality refers to cases where the current passed to the switching elements 51a1 to 51a4 is excessive with a sharp rising, where the temperature in the switching elements 51a1 to 51a4 is at a prescribed value or higher, and where the voltage of the on/off signals for the switching elements 51a1 to 51a4 is likely to be unstable. These phenomena could give rise to damages to the switching elements 51a1 to 51a4.

By the above-described operation, an abnormality in a switching element can be detected, so that the power storage system can quickly be stopped and further damages can be prevented.

Abnormality Detection 12-1

Primary Side Excess Current Detection

After step 1A-1 in which the turning on of the switch 8a in the breaking unit 8 is complete or after step 4B-1, if the switch 8a opens by itself because of excess current, the system control unit 120(1) detects the auxiliary contact signal S0 being turned off despite the closing command S0 being on, stops the switching elements 51a1 to 51a4 in the DC-DC converter 50(1), turns off the closing commands S0, S1, S2, and S5 to S7 for the switches 8a, 31a, 31b, and 71a to 71c, inputs a discharge command S4 to the discharge circuit unit 45(1) and discharges the primary side capacitor 43 and the secondary side capacitor 63.

If the switch 8a opens by itself because of excess current, it is possible that the excess current has been passed because of a short circuit or a ground fault, and therefore the above-described operation allows the power storage system to be quickly stopped, so that further damages can be prevented.

Abnormality Detection 13-1

Secondary Side Excess Current Detection

If a fuse 101a or 101b blows, the auxiliary contact signals F8 and F9 are turned on, and therefore the system control unit 120(1) detects states, stops the switching elements 51a1 to 51a4 in the DC-DC converter 50(1), turns off the closing commands S0, S1, S2, and S5 to S7 for the switches 8a, 31a, 31b, and 71a to 71c, inputs a discharge command S4 to the discharge circuit unit 45(1) and discharges the primary side capacitor 43 and the secondary side capacitor 63.

It is considered that the fuses 101a and 101b are blown by passage of excess current caused by a short circuit or a ground fault, and therefore the above-described operation allows the power storage system to be quickly stopped, so that further damages can be prevented.

Abnormality Detection 14-1

Power Storage Unit Abnormality Detection

The system control unit 120(1) turns off the switching elements 51a1 to 51a4 if a status signal F10 indicating a temperature abnormality, overcharge, or overdischarge is input from the power storage unit monitor 112.

Then, if a temperature abnormality is indicated, the switching elements 51a1 to 51a4 start to operate when F10 no longer indicates the temperature abnormality.

If overcharge is indicated, only the power flow from the secondary side to the primary side is allowed to operate the DC-DC converter 50(1) in order to have the power storage unit 110 discharged.

Conversely, if overdischarge is indicated, only the power flow from the primary side to the secondary side is allowed to operate the DC-DC converter 50(1) in order to have the power storage unit 110 charged.

Note that if the status signal F10 continues to indicate any of the temperature abnormality, overcharge and overdischarge after a prescribed period, the power storage unit 110 may have an unrecoverable abnormality, and therefore the system control unit 120(1) stops the switching elements 51a1 to 51a4 in the DC-DC converter 50(1), turn off the closing commands S0, S1, S2, and S5 to S7 for the switches 8a, 31a, 31b, and 71a to 71c, inputs a discharge command S4 to the discharge circuit unit 45(1) and discharges the primary side capacitor 43 and the secondary side capacitor 63.

By the above-described operation, an abnormality in the power storage unit can be detected, so that the power storage unit can quickly be stopped, and further damages can be prevented.

Note that when any of these abnormalities is detected, the occurrence of the abnormality is preferably recorded by the system control unit or indicated by an indicator lamp (not shown), an indicator monitor (not shown) or the like provided at the device, the driver's seat or the like.

Among the kinds of abnormality detection described above, it is highly likely that the following kinds of abnormality detection worsen the damages if re-activation is carried out: abnormality detection 1-1 (the differential current abnormality detection), abnormality detection 2-1 (the switch abnormality detection), abnormality detection 3-1 (the primary side capacitor charging abnormality detection in the primary side activation), abnormality detection 4-1 (the secondary side capacitor charging abnormality detection in the primary side activation), abnormality activation 5-1 (the secondary side capacitor charging abnormality detection in the secondary side activation), abnormality detection 6-1 (the primary side capacitor charging abnormality detection in the secondary side activation), abnormality detection 11-1 (the switching element abnormality detection), abnormality detection 12-1 (the primary side excess current detection), abnormality detection 13-1 (the secondary side excess current detection), and abnormality detection 14-1 (the power storage unit abnormality detection). Therefore, the system control unit 120(1) prohibits the activation of the power storage system as soon as it detects any of these abnormalities. The activation prohibition does not end unless there is a manual operation such as pressing a reset button provided at the driver's platform or the system control unit.

In this way, further damages to the affected parts can be prevented by preventing careless re-activation operation.

Among the kinds of abnormality detection described above, it is considered that the following cases are temporary phenomena caused by disturbance or the like: abnormality detection 7-1 (the primary side capacitor excess voltage detection), abnormality detection 8-1 (the secondary side capacitor excess voltage detection), abnormality detection 9-1 (the DC-DC converter excess current detection), and abnormality detection 10-1 (the DC-DC converter temperature abnormality detection). Therefore, the system control unit 120(1) carries out a stopping procedure and then automatically carries out re-activation after a prescribed period. At the time, the presence/absence of another abnormality is monitored, and unless an abnormality of the same kind is detected in a certain period, the operation is continued, and if an abnormality of the same kind is detected within the certain period, the activation of the power storage system is prohibited as soon as the abnormality is detected. The activation prohibition does not end unless there is a manual operation such as pressing a reset button provided at the driver's platform or the system control unit.

In this way, the power storage system can be prevented from being excessively stopped by temporary abnormalities caused by disturbance, while further damages to the affected parts that could otherwise be caused by careless re-activation can be prevented.

Furthermore, the system control unit 120(1) carries out the following operation if the voltage of the control power supply is lower than a prescribed value.

If the voltage of the control power supply for the system control unit 120(1) is lower than the prescribed value or turned off, a discharge command S4 is input to the discharge circuit unit 45(1) and the primary side capacitor 43 and the secondary side capacitor 63 are discharged.

The closing commands S0 to S2, and S5 to S7 are turned off in order to open the switches 8a, 31a, 31b, and 71a to 71c at the same time.

The meaning of the above-described operation will be described.

The switching elements 51a1 to 51a4 could be damaged if the voltage of a gate signal that controls their on/off states is dropped, and in order to avoid the damage, the system control unit 120(1) quickly stops switching when the control power supply is turned off, and discharges the primary side capacitor 43 and the secondary side capacitor 63, so that voltage is not applied across the switching elements.

Note that if the control power supply is turned off, reliable discharge operation is necessary, and therefore the system control unit 120(1) and the discharge element driving circuit 46d each have a power supply backup circuit (not shown) having a power storage element such as an electrolytic capacitor used to maintain the control power supply voltage after the control power supply is turned off and keeps the discharge element 46c in an on state until the discharge is complete (normally about for three seconds).

In this way, if the control power supply is suddenly interrupted while the power storage system operates, the primary side capacitor 43 and the secondary side capacitor 63 can surely be discharged, and the switches can be opened.

Therefore, the switching elements as well as the power storage system can be prevented from being damaged.

With the structure according to the first embodiment described above, a power storage system most appropriately applied to a traction system can be provided. The system allows optimum activation, operation, stopping, an abnormality detection method, and an operation method upon abnormality detection that are important and necessary in using the power storage system.

Note that in the description of the DC power supply with reference to FIG. 2, the DC power supply is provided at the vehicle side through the pantograph, and the description concerns the case in which the power storage system is provided in the vehicle, while the power storage system may be provided between stations at the ground level or at an electric power substation (not shown).

Second Embodiment

Figure 18:
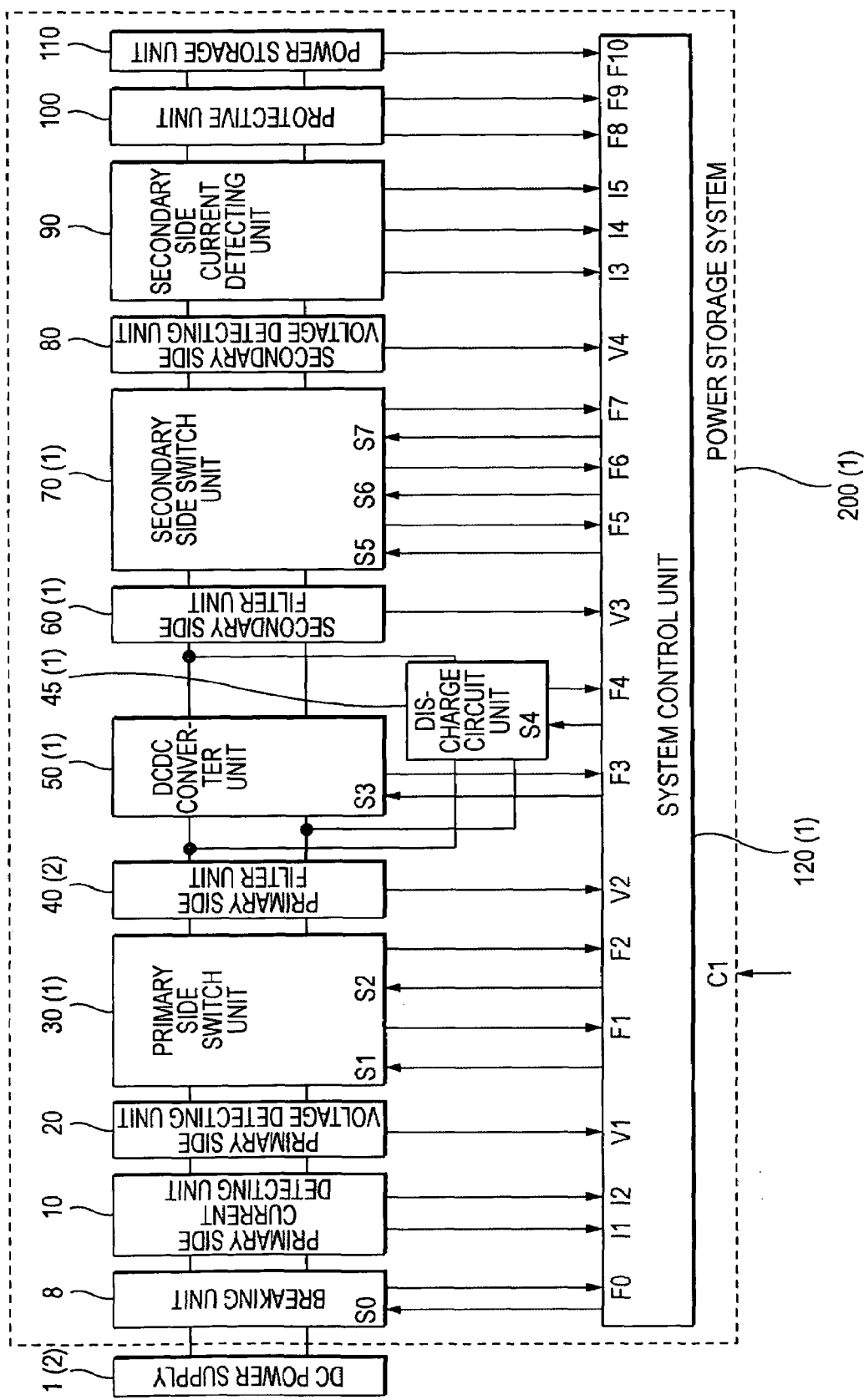
FIG. 18 is a diagram of the configuration of a power storage system according to a second embodiment.

FIG. 18 is a diagram of the configuration of a power storage system according to a second embodiment of the invention.

The second embodiment is a modification of the example of the first embodiment, therefore the same elements as those according to the first embodiment are denoted by the same reference characters and will not be described, and only the different elements will be described.

As shown in FIG. 18, a DC power supply 1(2) is provided instead of the DC power supply 1(1) and input to a power storage system 200(2).

The power storage system 200(2) is provided with a primary side filter unit 40(2) instead of the primary side filter 40(1).

Figure 19:
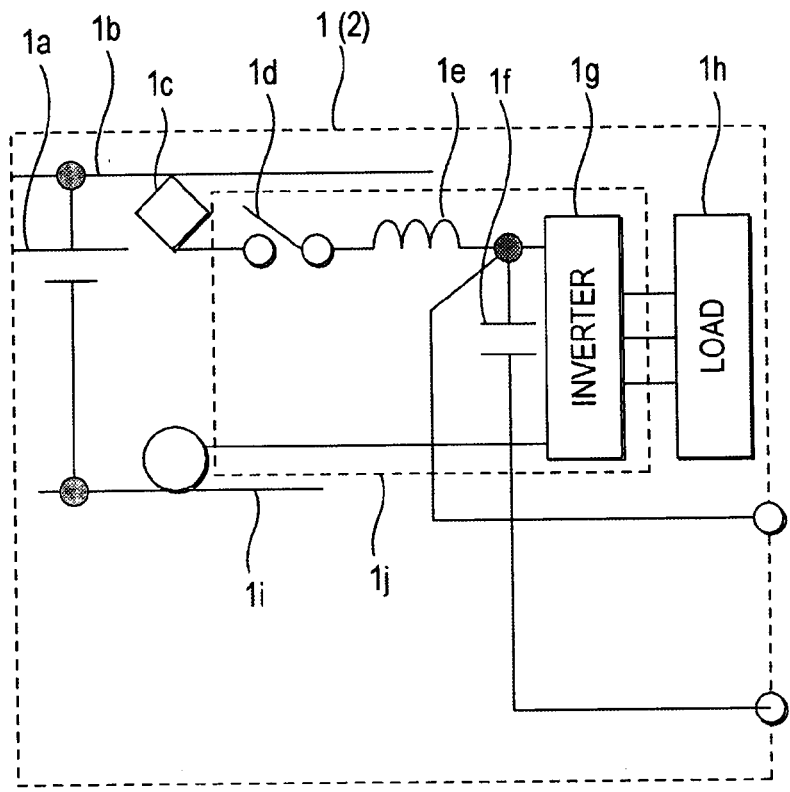
FIG. 19 is a diagram of an example of the configuration of a DC power supply 1(2) according to the second embodiment.

FIG. 19 is a diagram of an example of the configuration of the DC power supply 1(2) according to the second embodiment of the invention.

As shown in FIG. 19, the DC power supply 1(2) is voltage between both terminals of a capacitor 1f in a circuit including a power substation 1a, an overhead contact line 1b, a pantograph 1c, a rail 1i, a switch 1d having a current breaking function, a reactor 1e, the capacitor 1f, and a drive controller 1j including an inverter 1g that drives an electric generator or a load 1h.

Figure 20:
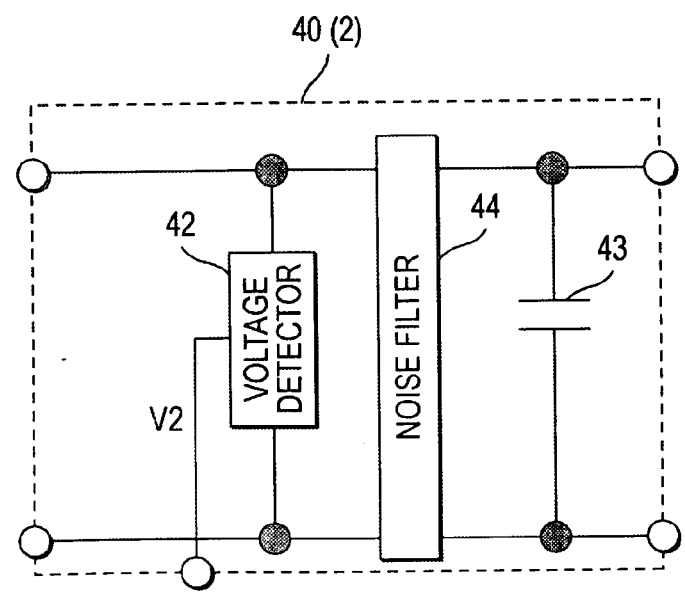
FIG. 20 is a diagram of an example of the configuration of a primary side filter unit 40(2) according to the second embodiment.

FIG. 20 is a diagram of an example of the configuration of the primary side filter 40(2) according to the second embodiment of the invention. The reactor 41 is removed, a noise filter 44 is connected in the succeeding stage of the voltage detector 42 that detects the primary side capacitor voltage V2, and the primary side capacitor 43 is provided in the succeeding stage of the noise filter 44.

Note that the operation steps from the activation through the steady state operation to the stopping of the power storage system 200(2) according to the second embodiment of the invention, a method of detecting abnormalities, and operation to be carried out when an abnormality is detected are what is described by the content of the first embodiment and therefore the description will not be provided.

With the structure according to the second embodiment described above, if the power storage system is used in combination with the drive controller 1j, the reactor 1e in the drive controller 1j can be shared, so that the reactor 41 used according to the first embodiment can be omitted and therefore a compact and lightweight power storage system can be obtained.

If the breaking unit 8 is omitted and the switch 1d in the drive controller 1j is made to serve the function, an even more compact and lightweight power storage system can be obtained.

Third Embodiment

Figure 21:
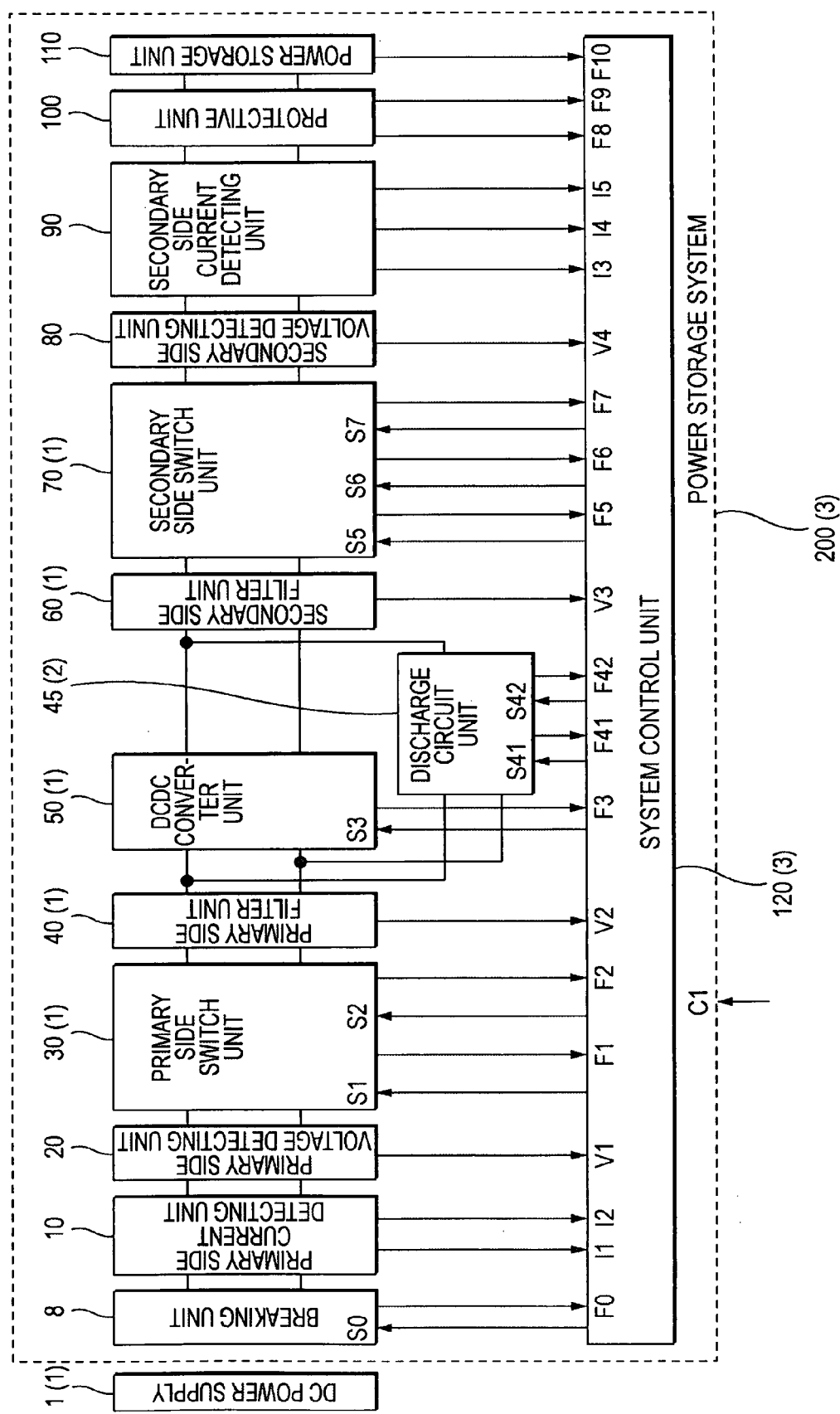
FIG. 21 is a diagram of an example of the configuration of a power storage system according to a third embodiment.

FIG. 21 is a diagram of an example of the configuration of a power storage system according to a third embodiment of the invention.

The third embodiment is a modification of the example of the first embodiment, therefore the same elements as those according to the first embodiment are denoted by the same reference characters and will not be described, and only the different elements will be described.

As shown in FIG. 21, a power storage system 200(3) includes a discharge circuit unit 45(2) instead of the discharge circuit unit 45(1) and a system control unit 120(3) instead of the system control unit 120(1).

The system control unit 120(3) outputs a primary side discharge command S41 and a secondary side discharge command S42 to the discharge circuit unit 45(2) and is provided with status signals F41 and F42 from the discharge circuit unit 45(2).

Figure 22:
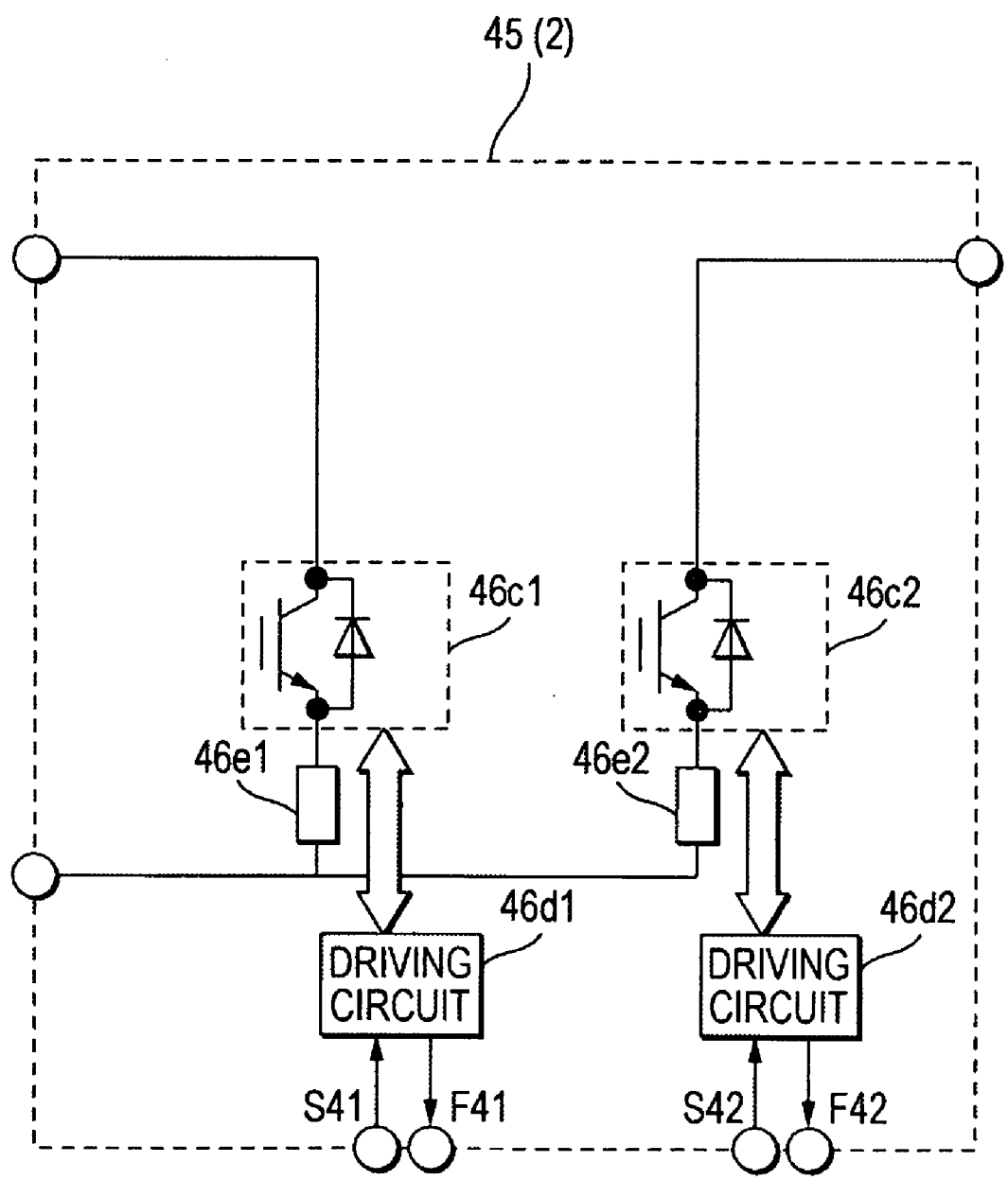
FIG. 22 is a diagram of an example of the configuration of a discharge circuit unit 45(2) according to the third embodiment.

FIG. 22 is a diagram of an example of the configuration of the discharge circuit unit 45(2) according to the third embodiment of the invention.

As shown in FIG. 22, the positive side of a circuit having a series connection of a discharge element 46c1 and a discharging resistor 46e1 is connected with a line led from the positive side of the succeeding stage of the primary side filter unit 40(1), and the negative side is connected to the negative side line.

The positive side of a circuit having a series-connection of a discharge element 46c2 and a discharging resistor 46e2 is connected with a line led from the positive side of the preceding stage of the secondary side filter unit 60(1), and the negative side is connected to the negative side line.

The on/off state of the discharge element 46c1 or 46c2 is controlled by a discharge element driving circuit 46d1 or 46d2. The discharge element driving circuit 46d1 or 46d2 is provided with a primary side discharge command S41 or a secondary side discharge command S42 including an on/off command for the discharge element 46c1 or 46c2 from the system control unit 120(3), and a status signal F41 or F42 including the operation state of the discharge element 46c1 or 46c2 is input to the system control unit 120(2).

Note that the operation steps from the activation through the steady state operation to the stopping of the power storage system 200(3) according to the third embodiment are described by the content of the first embodiment when the system control unit 120(3) is substituted for the system control unit 120(1) and therefore the description will not be provided.

Regarding an abnormality detecting method and operation to be carried out when an abnormality is detected, the following abnormality detection 7-3 and abnormality detection 8-3 are carried out unlike the content of the first embodiment in which abnormality detection 7-1 and abnormality detection 8-1 are carried out.

Abnormality Detection 7-3

Primary Side Capacitor Excess Voltage Detection

If the primary side capacitor voltage V2 detected by the voltage detector 42 exceeds a prescribed value, the system control unit 120(3) stops the switching elements 51a1 to 51a4 in the DC-DC converter 50(1), turns off closing commands S1, S2, and S5 to S7 for the switches 31a, 31b, and 71a to 71c, inputs a primary side discharge command S41 to the discharge circuit unit 45(2) and discharges the primary side capacitor 43.

By the operation described above, excess voltage for the primary side capacitor voltage V2 can be detected, so that the power storage system can quickly be stopped, and further damages can be prevented.

Note that according to the third embodiment, the secondary side capacitor 63 is not discharged, and therefore unnecessary discharge operation can be saved.

Abnormality Detection 8-3

Secondary Side Capacitor Excess Voltage Detection

If the secondary side capacitor voltage V3 detected by the voltage detector 62 exceeds a prescribed value, the system control unit 120(1) stops the switching elements 51a1 to 51a4 in the DC-DC converter 50(3), turns off the closing commands S1, S2, and S5 to S7 for the switches 31a, 31b, and 71a to 71c and inputs a secondary side discharge command S42 to the discharge circuit unit 45(2) and discharges the secondary side capacitor 63.

By the above-described operation, excess voltage for the secondary side capacitor voltage V3 can be detected, the power storage system can quickly be stopped, so that further damages can be prevented.

According to the third embodiment, the primary side capacitor 43 is not discharged, and therefore unnecessary discharge operation can be saved.

Other kinds of abnormality detection are described by the content of the first embodiment when the discharge circuit unit 45(2) is substituted for the discharge circuit unit 45(1), the primary side discharge command S41 and the secondary side discharge command S42 are substituted for the discharge command S4, and the discharge elements 46c1 and 46c2 are substituted for the discharge element 46c.

With the structure according to the third embodiment, the primary side capacitor 43 and the secondary side capacitor 63 can separately be discharged as desired, which saves unnecessary discharge operation, and therefore an efficient power storage system can be provided.

Fourth Embodiment

Figure 23:
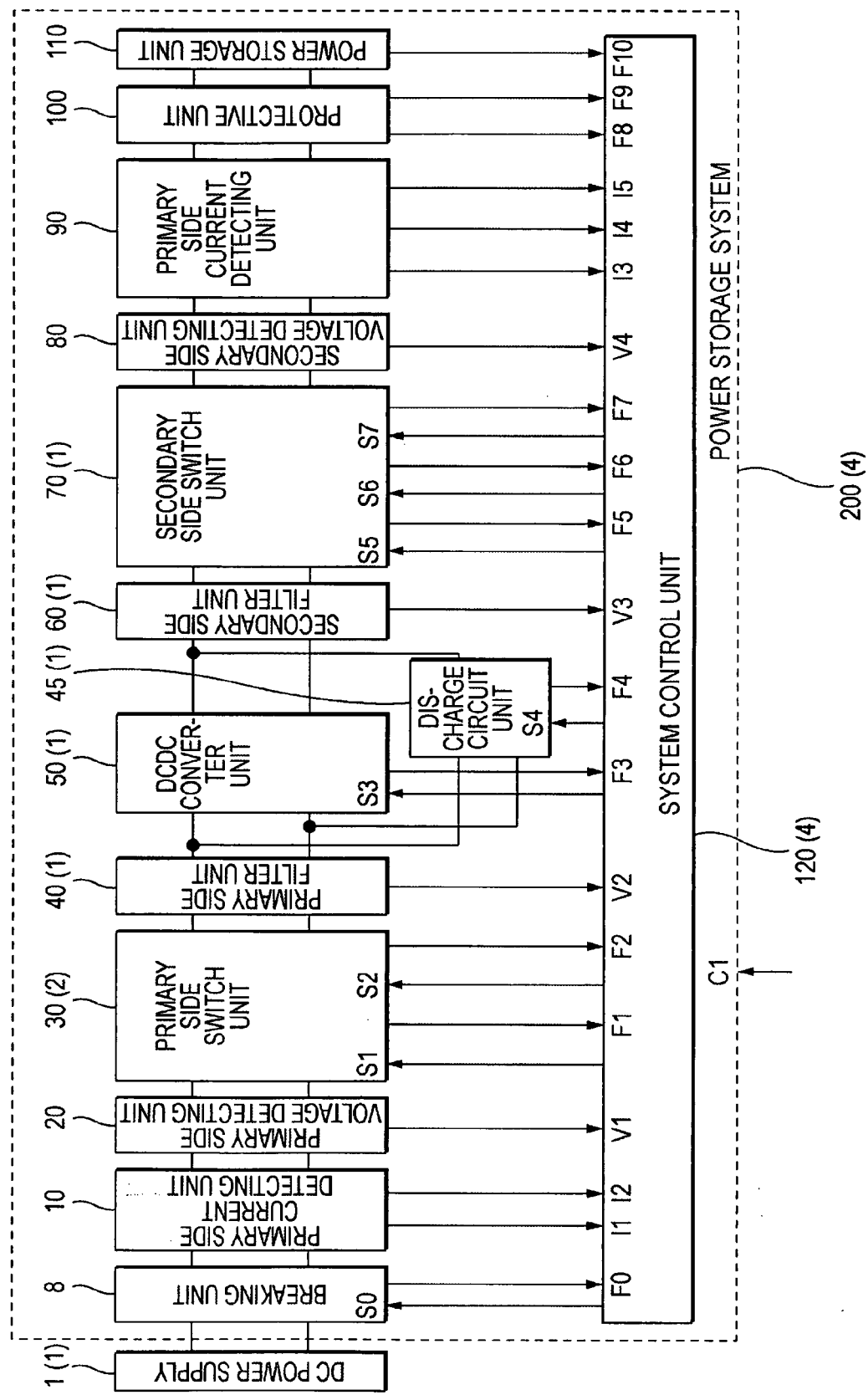
FIG. 23 is a diagram of a power storage system according to a fourth embodiment.

FIG. 23 is a diagram of an example of the configuration a power storage system according to a fourth embodiment of the invention.

The fourth embodiment is a modification of the example of the first embodiment. Therefore, the same elements as those of the first embodiment will be denoted by the same reference characters and their description will not be provided, while only the different elements will be described.

As shown in FIG. 23, a power storage system 200(4) includes a primary side switch unit 30(2) and a system control unit 120(4) instead of the primary side switch part 30(1) and the system control unit 120(1), respectively.

Figure 24:
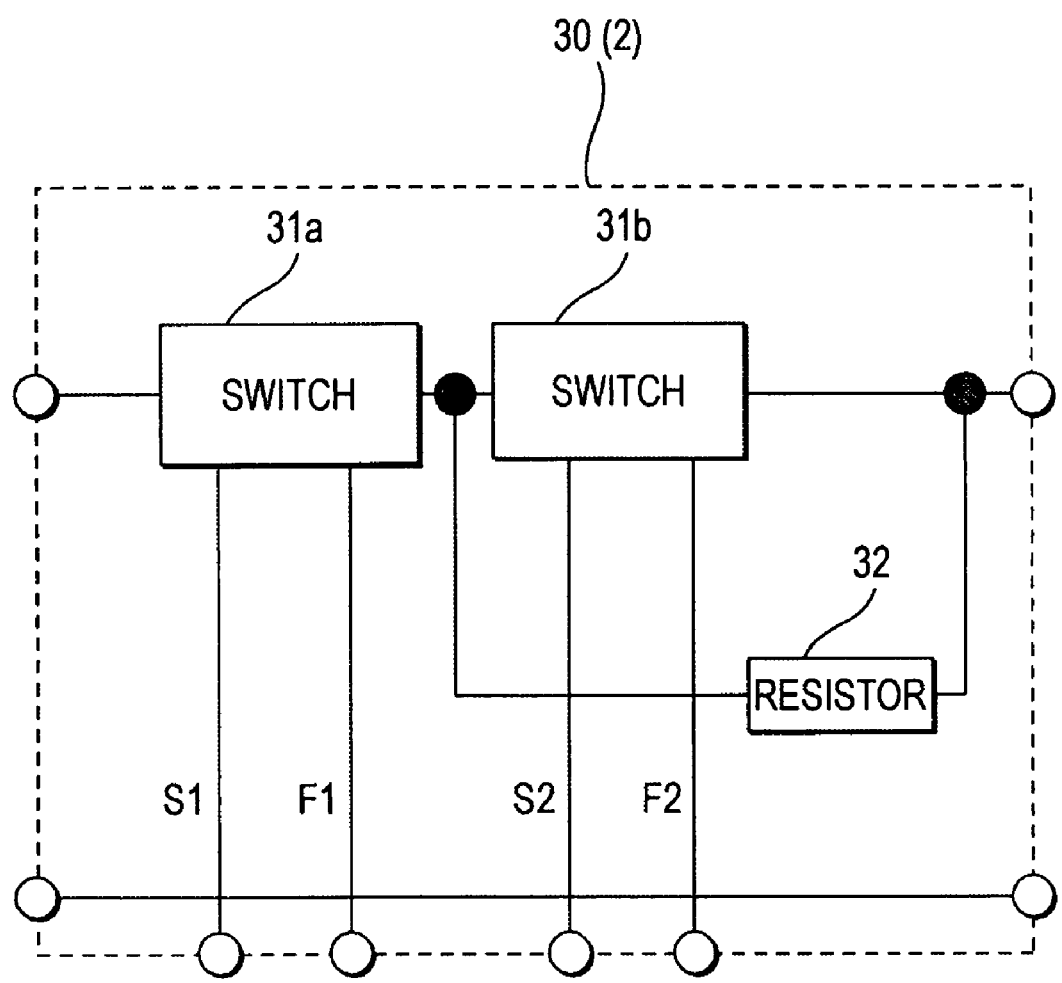
FIG. 24 is a diagram of an example of the configuration of a primary side switch unit 30(2) according to the fourth embodiment.

FIG. 24 is a diagram of an example of the configuration of the primary side switch unit 30(2) according to the fourth embodiment of the invention.

As shown in FIG. 24, the primary side switch unit 30(2) includes a switch 31a and a switch 31b arranged in series with the positive side and a charging resistor 32 connected in parallel to the switch 31b. The switches 31a and 31b are provided with closing signals S1 and S2, respectively. Auxiliary contact signals F1 and F2 are input to the system control unit 120(4) from the switches 31a and 31b, respectively.

Now, the operation steps from the activation through the steady state operation to the stopping of the power storage system 200(4) according to the fourth embodiment will be described.

Primary Side Activation

Step 1A-4

The step is the same as step 1A-1 according to the first embodiment when the system control unit 120(4) is substituted for the system control unit 120(1) and therefore the description will not be provided.

Step 2A-4

After recognizing the normal turning on of the switch 8a, the system control unit 120(4) outputs a closing command S1, excites the coil 31a3 of the switch 31a and closes the main contact 31a1 if the state in which the primary side voltage V1 detected by the voltage detector 21 is at a prescribed value or higher continues for a certain period. In this way, the primary side capacitor 43 is charged through the charging resistor 32.

If the state in which the closing command S1 is on and the auxiliary contact 31a2 of the switch 31a is surely closed to turn on the auxiliary contact signal F1 continues for a certain period, the system control unit 120(4) determines that the switch 31a has normally been turned on. Then, after a prescribed period or if the difference between the primary side voltage V1 and the primary side capacitor voltage V2 becomes a prescribed value or less and the state continues for a certain period, the system control unit determines that the charging of the primary side capacitor 43 is complete and outputs a closing command S2. This excites the coil 31a3 of the switch 31b, and the main contact 31a1 is closed.

If the state in which the auxiliary contact 21a2 of the switch 31b is surely closed, and the auxiliary contact signal F2 is turned on continues for a certain period, the system control unit 120(3) determines that the switch 31b has normally been turned on.

Step 3A-4

Upon recognizing the normal turning on of the switch 31b, the system control unit 120(4) outputs an operation command S3 to the converter control unit 52a. At the time, S3 is a signal including a command to have the DC-DC converter 50(1) operated so that the secondary side capacitor 63 is charged in an initial charging mode, the secondary side capacitor voltage V3, and the secondary side voltage V4. Upon receiving the operation command S3, the converter control unit 52a controls the converter circuit 51a so that the secondary side capacitor voltage V3 becomes equal to the secondary side voltage V4 and passes necessary power from the primary side to the secondary side to charge the secondary side capacitor 63. At the time, the converter control unit 52a is capable of charging the secondary side capacitor 63 while controlling the current of the converter circuit 51a so that the current passed from the primary side to the secondary side is restricted to a prescribed value in order to prevent the secondary side capacitor 63 from being damaged by abrupt charging.

The system control unit 120(4) determines that the charging of the secondary side capacitor 63 is complete if the difference between the secondary side capacitor voltage V3 and the secondary side voltage V4 is a prescribed value or less and then a prescribed period elapses.

Steps 4A-4 to 8A-4

The steps are the same as steps 4A-1 to 8A-1 according to the first embodiment when the system control unit 120(4) is substituted for the system control unit 120(1) and therefore the description will not be provided.

Secondary Side Activation

Steps 1B-4 to 2B-4

The steps are the same as steps 1B-1 to 2B-1 according to the first embodiment when the system control unit 120(4) is substituted for the system control unit 120(1) and therefore the description will not be provided.

Step 3B-4

Upon determining that the charging of the primary side capacitor 43 is complete, the system control unit 120(4) turns on the closing commands S1 and S2 to turn on the switches 31a and 31b. In this way, the closing coils 31a3 of the switches 31a and 31b are driven, and the main contacts 31a1 are closed. In this way, the auxiliary contacts 31a2 linked with the main contacts 31a1 are closed, and the auxiliary contact signals F1 and F2 representing the states of the auxiliary contacts 31a2 are output to the system control unit 120(4).

The system control unit 120(4) recognizes the normal turning on of the switches 31a and 31c if the state in which the closing commands S1 and S2 are on and the auxiliary contacts 31a2 of the switches 31a are surely closed to turn on the auxiliary contact signals F1 and F2 continues for a certain duration.

Step 4B-4

The system control unit 120(4) determines the normal turning on of the switches 31a and 31b, then outputs a closing command S0 for the switch 8a, excites the coil 31a3 of the switch 8a and closes the main contact 31a1.

If the state in which the closing command S0 is on, the auxiliary contact 31a2 of the switch 8a is surely closed and the auxiliary contact signal F0 is on continues for a certain period, the system control unit 120(4) recognizes the normal turning on of the switch 8a.

Steps 5B-4 to 8B-4

The steps are the same as steps 5B-1 to 8B-1 according to the first embodiment when the system control unit 120(4) is substituted for the system control unit 120(1) and therefore the description will not be provided. Note that a method of detecting abnormalities and operation to be carried out when an abnormality is detected are described by the content of the first embodiment when the system control unit 120(4) is substituted for the system control unit 120(1) and therefore the description will not be provided.

With the structure according to the fourth embodiment described above, the switches 31a and 31b are arranged in series and therefore if for example the switch 31b cannot be opened because of a failure, the circuit can be opened using the switch 31a, so that a power storage system that allows the primary side circuit to be more surely opened can be provided.

Fifth Embodiment

Figure 25:
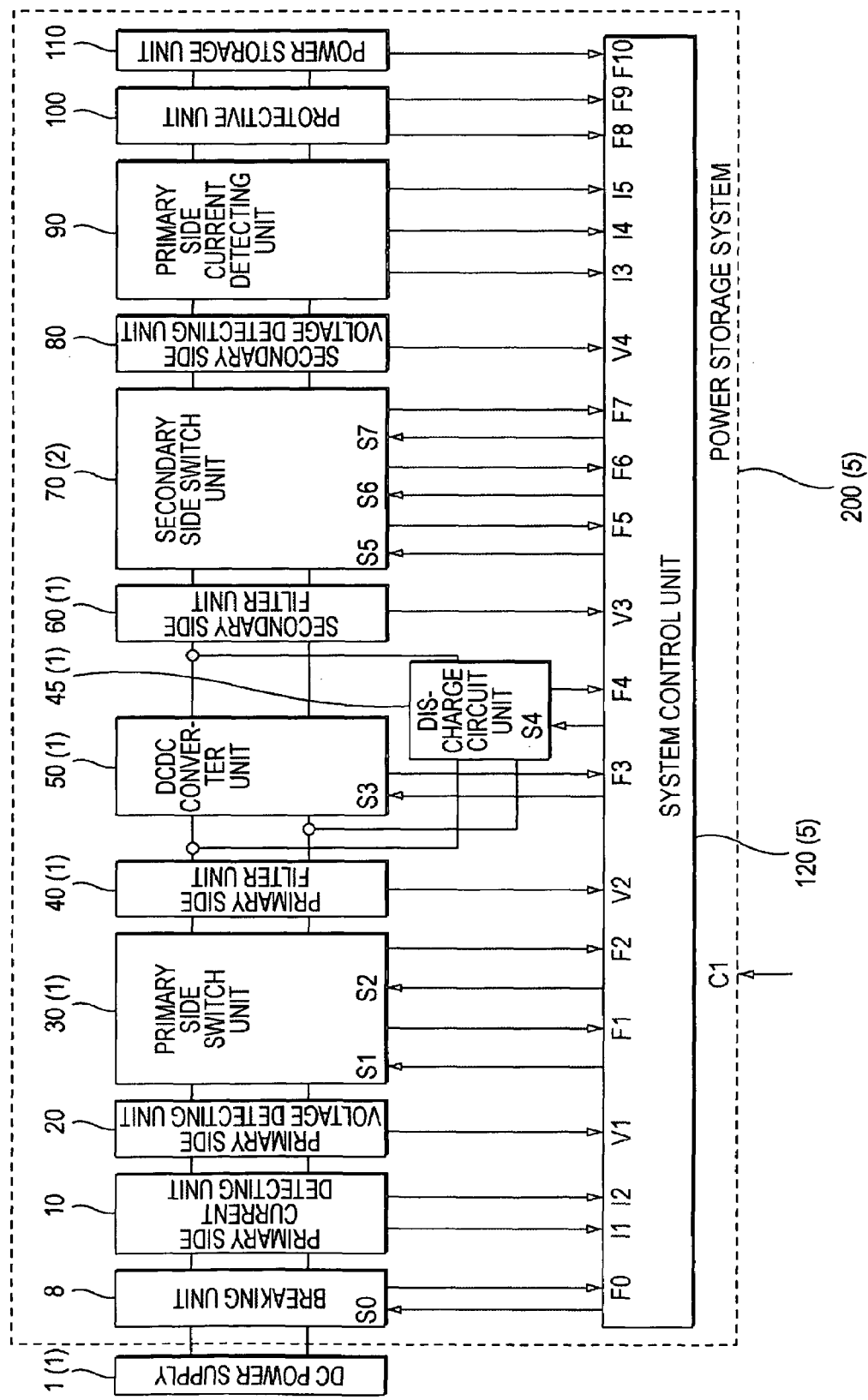
FIG. 25 is a diagram of an example of the configuration of a power storage system according to a fifth embodiment.

FIG. 25 is a diagram of an example of the configuration of a power storage system according to a fifth embodiment of the invention.

The fifth embodiment is a modification of the example of the first embodiment, therefore the same elements as those according to the first embodiment are denoted by the same reference characters and will not be described, and only the different elements will be described.

As shown in FIG. 25, a power storage system 200(5) includes a secondary side switch unit 70(2) and a system control unit 120(5) instead of the secondary side switch unit 70(1) and the system control unit 120(1), respectively.

Figure 26:
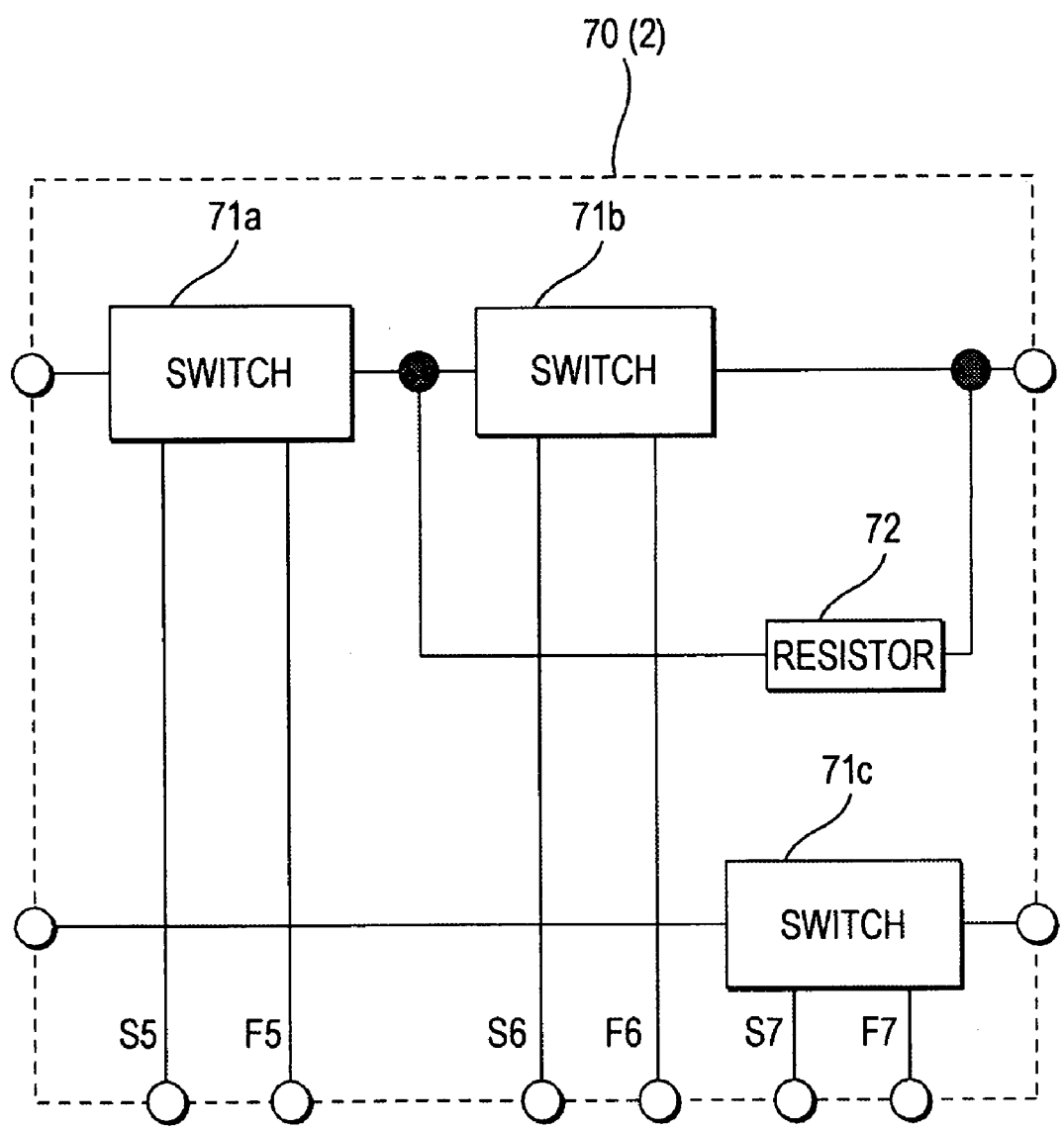
FIG. 26 is a diagram of an example of the configuration of a secondary side switch unit 70(2) according to the fifth embodiment.

FIG. 26 is a diagram of an example of the configuration of the secondary side switch unit 70(2) according to the fifth embodiment of the invention.

As shown in FIG. 26, the secondary side switch unit 70(2) includes switches 71a and 71b arranged in series with the positive side, a charging resistor 72 connected in parallel to the switch 71b, and a switch 71c arranged in series with the negative side.

The switches 71a to 71c are provided with closing signals S5 to S7, respectively from the system control unit 120(5), and auxiliary contact signals F5 to 7 are input to the system control unit 120(5) from the switches 71a to 71c, respectively.

The internal structure of the switches 71a to 71c is the same as that shown in FIG. 7 and therefore the description will not be provided.

Note that in the above description, the switches 71a to 71c are mechanical switches, but they may be other kinds of switches such as semiconductor type contactless switches as long as the closing/opening and the operation confirmation of the circuit can be carried out.

Now, the operation steps from the activation through the steady state operation to the stopping of the power storage system 200(5) according to the fifth embodiment will be described.

Primary Side Activation

Steps 1A-5 to 3A-5

These steps are the same as steps 1A-1 to 3A-1 according to the first embodiment when the system control unit 120(5) is substituted for the system control unit 120(1) and therefore the description will not be provided.

Step 4A-5

Upon determining that the secondary side capacitor 63 has normally been charged, the system control unit 120(5) turns on the closing commands S5 to S7 that turn on the switches 71a to 71c. In this way, the closing coils 31a3 of the switches 71a to 71c are driven, and the main contacts 31a1 are closed. In this way, auxiliary contacts 31a2 linked with the main contacts 31a1 are closed, and auxiliary contact signals F5 to F7 indicating the states of the auxiliary contacts 31a2 are output to the system control unit 120(5).

The system control unit 120(5) recognizes the normal turning on of the switches 71a to 71c if the state in which the closing commands S5 to S7 are on, the auxiliary contacts 31a2 of the switches 71a to 71c are surely closed and the auxiliary contact signals F5 to F7 are on continues for a certain period.

Note that the switches 71a to 71c may be turned on simultaneously or sequentially. The sequential turning on allows the peak power necessary for turning them on to be reduced, and the switch last turned on can be only the switch capable of opening and closing current. In general, a switch capable of opening and closing current is large in size.

Therefore, the number of switches to be used can be reduced, so that a compact and lightweight device can be provided.

Step 5A-5

Upon determining that the turning on of the switches 71a to 71c is normally complete, the system control unit 120(5) outputs an operation command S3 to the converter control unit 52a so that the operation is carried out while the current IL (or the negative side current ILN) of the coupling reactor 51a5 is kept at zero.

In this way, the converter control unit 52a controls the converter circuit 51a so that the current IL (or negative side current ILN) of the coupling reactor 51a5 is at zero.

Note that the control may be carried out so that the converter primary side current I1P (or I1N) becomes zero or the converter secondary side current I2P (or I2N) becomes zero, or the primary side current I1 detected by the current detector 11, or the secondary side positive current I3 detected by the current detector 91 becomes zero. The operation may be carried out so that the secondary side negative side current I5 as the detection value of the current detector 93 becomes zero instead of the secondary side positive side current I3.

The system control unit 120(5) determines that the converter control unit 52a is normal if the state in which the detection value of current to be controlled is a prescribed value or less continues for a prescribed period.

Step 6A-5

The step is the same as step 6A-1 according to the first embodiment when the system control unit 120(5) is substituted for the system control unit 120(1) and therefore the description will not be provided.

Step 7A-5

The step is the same as step 7A-1 according to the first embodiment when the system control unit 120(5) is substituted for the system control unit 120(1) and therefore the description will not be provided.

Step 8A-5

The step is the same as step 8A-1 according to the first embodiment when the system control unit 120(5) is substituted for the system control unit 120(1) and therefore the description will not be provided.

Secondary Side Activation

Step 1B-5

When the control power supply for the system control unit 120(5) is turned on and a command C1 including an activation command is externally input, the system control unit 120(5) confirms a status signal F10 from the power storage unit monitor 112 of the power storage unit 110 and turns on the closing commands S5 and S7 for the witches 71a and 71c, respectively if there is no abnormality and the state in which the secondary side voltage V4 detected by the voltage detector 81 is at a prescribed value or more continues for a certain period. In this way, the closing coils 31a3 of the switches 71a and 71c are driven and the main contacts 31a1 are closed. In this way, auxiliary contacts 31a2 linked with the main contacts 31a1 are closed, and auxiliary contact signals F5 and F7 indicating the states of the auxiliary contacts 31a2 are output to the system control unit 120(5).

The system control unit 120(5) determines that the turning on of the switches 71a and 71c is normally complete if the state in which the closing commands S5 and S7 are on, the auxiliary contacts 31a2 of the switches 71a and 71c are surely closed, and the auxiliary contacts signals F5 and F7 are on continues for a certain period.

Note that the switches 71a and 71c may be turned on simultaneously or sequentially. The sequential turning on allows the peak power necessary for turning them on to be reduced, and therefore a control power supply with only a small peak withstand voltage may be employed, so that a compact and lightweight power storage system can be obtained.

The turning on of the switches 71a and 71c allows the secondary side capacitor 63 to be charged through the charging resistor 72.

The system control unit 120(5) determines that the turning on of the switches 71a and 71c is normally complete, and then determines that the charging of the secondary side capacitor 63 is complete if the state continues for a certain period or if the difference between the secondary side voltage V4 and the secondary side capacitor voltage V3 becomes a prescribed value or less and a prescribed period elapses. The unit then outputs a closing command S6. This excites the coil 31a3 of the switch 71b and the main contact 31a1 is closed.

If the state in which the auxiliary contact 31a2 of the switch 71b is surely closed and the auxiliary contact signal F6 is on continues for a certain period, the system control unit 120(5) determines that the switch 71b has normally been turned on.

Step 2B-5

The step is the same as step 2B-1 according to the first embodiment when the system control unit 120(5) and the switch 71b are substituted for the system control unit 120(1) and the switch 71a, respectively and therefore the description will not be provided.

Steps 3B-5 to 8B-5

The steps are the same as steps 3B-1 to 8B-1 according to the first embodiment when the system control unit 120(5) is substituted for the system control unit 120(1) and therefore the description will not be provided.

Note that a method of detecting abnormalities can be described by the content of the first embodiment when the system control unit 120(5) is substituted for the system control unit 120(1) and therefore the description will not be provided.

With the structure according to the fifth embodiment, the switches 71a and 71b are arranged in series, and therefore if for example the switch 71b cannot be opened because of a failure, the circuit can be opened using the switch 71a, so that a power storage system that allows the secondary side circuit to be more surely opened can be provided.

Sixth Embodiment

Figure 27:
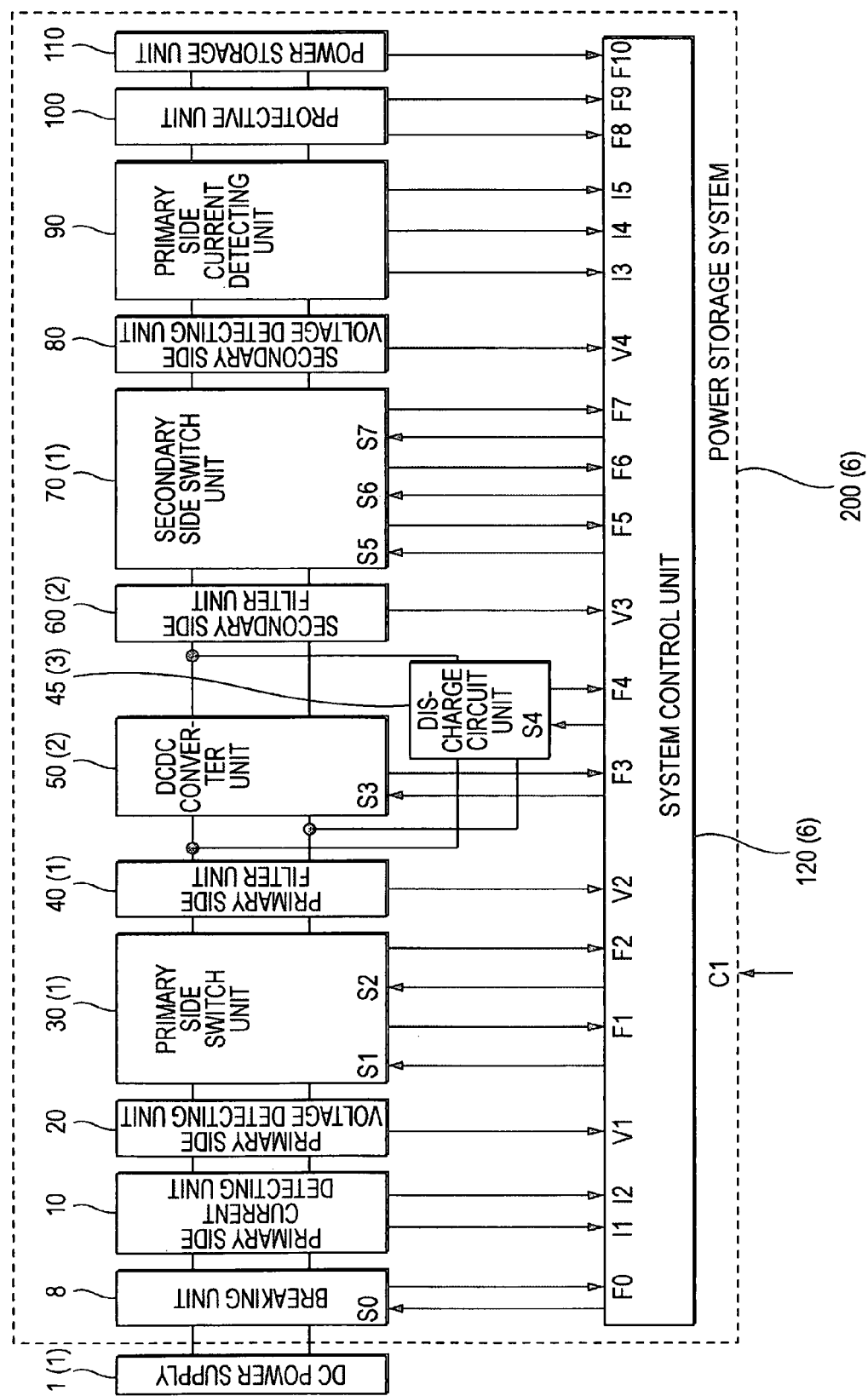
FIG. 27 is a diagram of an example of the configuration of a power storage system according to a sixth embodiment.

FIG. 27 is a diagram of an example of the configuration of a power storage system according to a sixth embodiment of the invention.

The sixth embodiment is a modification of the example of the first embodiment, therefore the same elements as those according to the first embodiment are denoted by the same reference characters and will not be described, and only the different elements will be described.

As shown in FIG. 27, the power storage system 200(6) includes a DC-DC converter unit 50(2), a discharge circuit unit 43(3), a secondary side filter unit 60(2), and a system control unit 120(6) instead of the DC-DC converter unit 50(1), the discharge circuit unit 45(1), the secondary side filter unit 60(1), and the system control unit 120(1), respectively.

The discharge circuit unit 45(3) is connected to the positive and negative sides of the succeeding stage of the primary side filter unit 40(1), and the secondary side filter unit 60(2) does not have a signal input to the system control unit 120(6).

Figure 28:
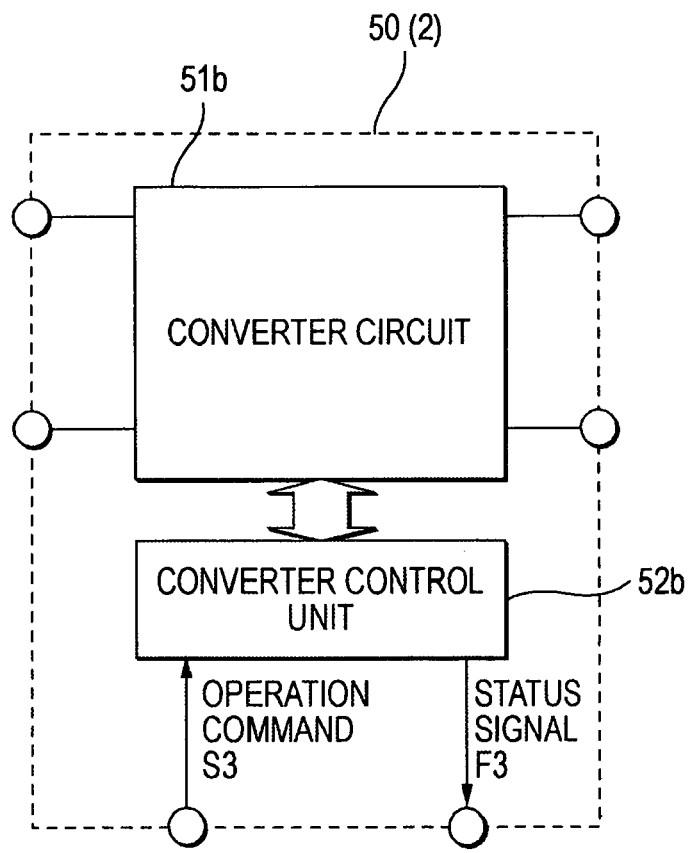
FIG. 28 is a diagram of an example of the configuration of a DC-DC converter 50(2) according to the sixth embodiment.

FIG. 28 is a diagram of an example of the configuration of the DC-DC converter 50(2) according to the sixth embodiment of the invention.

As shown in FIG. 28, the DC-DC converter 50(2) includes a converter circuit 51b and a converter control unit 52b, an operation command S3 is input from the system control unit 120(6) to the converter control unit 52b, and a status signal F3 is output from the converter control unit 52b to the system control unit 120(6).

Figure 29:
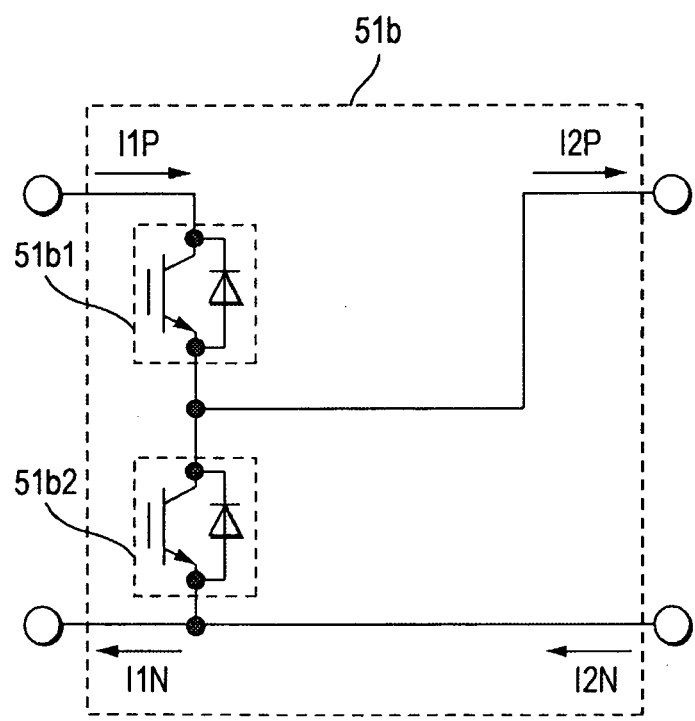
FIG. 29 is a diagram of an example of the configuration of a converter circuit 51b according to the sixth embodiment.

FIG. 29 is a diagram of an example of the configuration of the converter circuit 51b.

As shown in FIG. 29, the circuit is made of a bidirectional buck DC-DC converter circuit including two switching elements 51b1 and 51b2. The circuit is capable of controlling power flow in two directions only if the primary side voltage (at the left side terminal in the figure) of the converter circuit is always greater than the secondary side voltage (at the right side terminal in the figure).

The number of necessary switching elements for the circuit is half the number of those necessary for the converter circuit 51a according to the first embodiment, and therefore the DC-DC converter unit may be compact and lightweight, so that a compact and lightweight storage power storage system may be obtained.

As shown in FIGS. 28 and 29, the converter control unit 52b is provided with an operation command S3 including the operation, stopping, or control mode, and command values (target values) for power to be passed between the primary side and the secondary side, converter primary side current I1P (or I1N), converter secondary side current I2P (I2N), and primary side capacitor voltage V2, and a status signal F3 for the DC-DC converter 50(2) is input from the converter control unit 52b to the system control unit 120(6).

The status signal F3 is a status signal including the voltage, current, and temperature of each of the elements of the DC-DC converter 50(2) and the on/off sate and the failure state of the switching elements. The converter control unit 52b carries out PWM control to the switching elements 51b1 and 51b2 of the converter circuit 51b based on the operation command S3.

Figure 30:
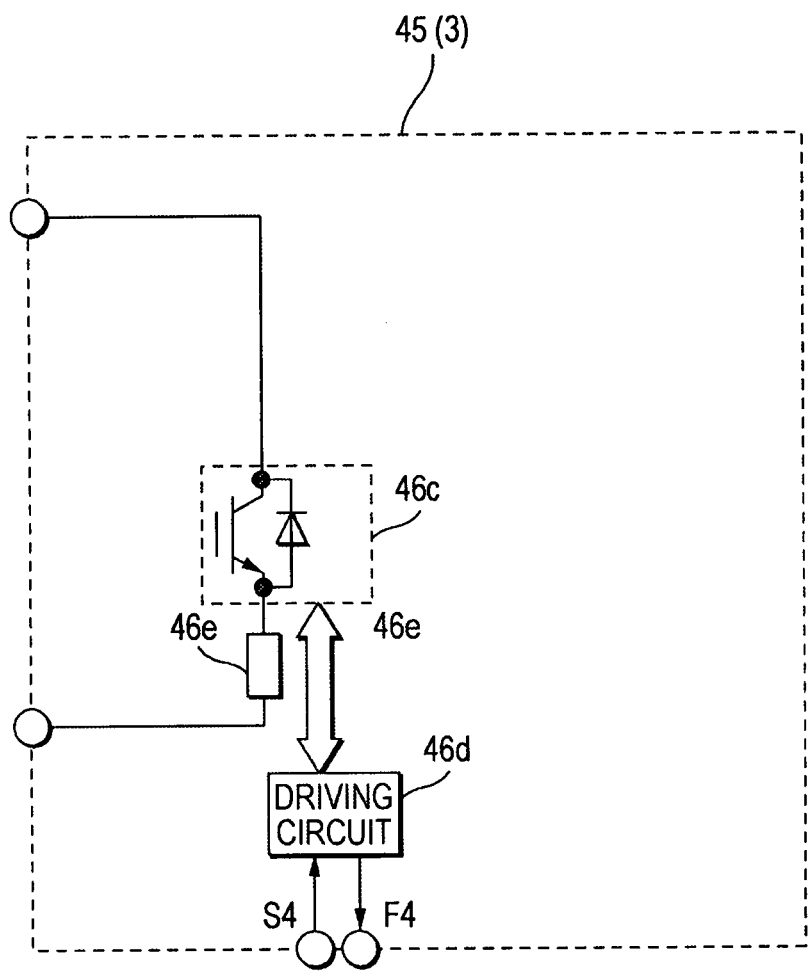
FIG. 30 is a diagram of an example of the configuration of a discharge circuit unit 45(3) according to the sixth embodiment.

FIG. 30 is a diagram of an example of the configuration of a discharge circuit unit 45(3) according to the sixth embodiment of the invention.

As shown in FIG. 30, the positive side of a circuit including a discharge element 46c and a discharging resistor 46e connected in series is connected to a line led from the positive side in the succeeding stage of the primary side filter unit 40(1), and the negative side is connected to the negative side line.

The on/off state of the discharge element 46c is controlled by a discharge element driving circuit 46d. The discharge element driving circuit 46d is provided with a discharge command S4 including an on/off command for the discharge element 46c from the system control unit 120(6), and a status signal F4 including the operation state of the discharge element 46c is input from the discharge element driving circuit 46d to the system control unit 120(6).

Figure 31:
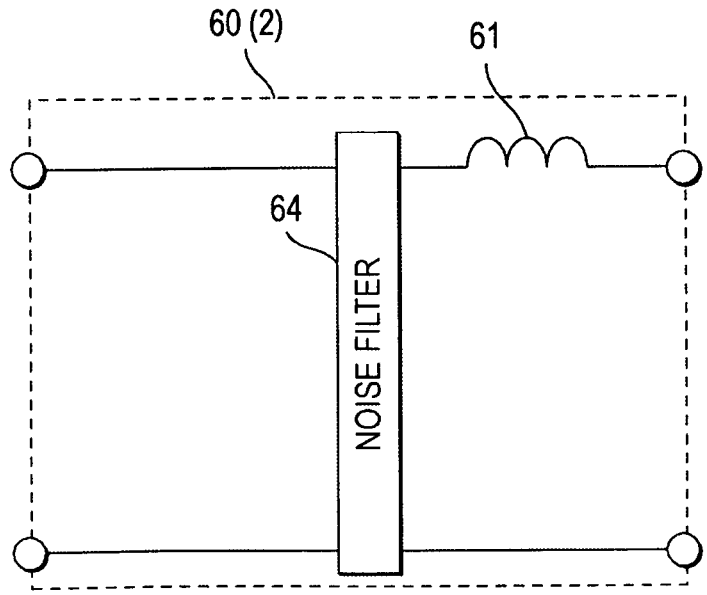
FIG. 31 is a diagram of an example of the configuration of a secondary filter unit 60(2) according to the sixth embodiment.

FIG. 31 is a diagram of an example of the configuration of the secondary filter unit 60(2) according to the sixth embodiment of the invention.

As shown in FIG. 31, a noise filter 64 is connected and a reactor 61 is connected in the succeeding stage of the noise filter 64.

The reactor 61 is used to carry out smoothing so that the current of the power storage unit 110 does not include a large ripple component.

The structure of the noise filter 64 is the same as what is described in conjunction with the first embodiment and therefore the description will not be provided.

The noise filter 64 is preferably provided near and succeeding the secondary side capacitor 63.

Now, the operation steps from the activation through the steady state operation to the stopping of the power storage system 200(6) according to the sixth embodiment will be described regarding the parts different from the first embodiment.

Primary Side Activation

Steps 1A-6 and 2A-6

The steps are the same as steps 1A-1 and 2A-1 according to the first embodiment when the system control unit 120(6) and the DC-DC converter 50(2) are substituted for the system control unit 120(1) and the DC-DC converter unit 50(1) and therefore the description will not be provided.

Step 3A-6

The step does not exist.

Step 4A-6

Upon determining that the turning on of the switch 31a has normally been completed, the system control unit 120(6) turns on the closing commands S5 and S7 to turn on the switches 71a and 71c. In this way, the closing coils 31a3 of the switches 71a and 71c are driven, and the main contacts 31a1 are closed. Then, the auxiliary contacts 31a2 linked with the main contacts 31a1 are closed and auxiliary contact signals F5 and F7 indicating the states of the auxiliary contacts 31a2 are output to the system control unit 120(6).

If the state in which the closing commands S5 and S7 are on, the auxiliary contacts 31a2 of the switches 71a and 71c are surely closed, and the auxiliary contact signals F5 and F7 are on continues for a certain period, the system control unit 120(6) recognizes that the switches 71a and 71c have normally been turned on.

Note that the switches 71a and 71c may be turned on simultaneously or sequentially. If they are sequentially turned on, the peak power necessary for turning them on may be reduced, and only the switch to be turned on last may serve as a switch capable of opening and closing current. In general, a switch capable of opening and closing current is large in size, and since the number of such switches may be reduced, a compact and lightweight power storage system can be obtained.

Step 5A-6

Upon determining that the turning on of the switches 71a and 71c has normally been completed, the system control unit 120(6) outputs an operation command S3 to the converter control unit 52b so that the converter primary side current I1P (or I1N) is kept at zero or the converter secondary side current I2P (or I2N) is kept at zero.

Note that the control may be carried out so that the primary side current I1 detected by the current detector 11 and the secondary side current I3 detected by the current detector 91 become zero.

The operation may be carried out so that the secondary side negative side current I5 as the detection value of the current detector 93 becomes zero instead of the secondary side positive side current I3.

The system control unit 120(6) determines that the converter control unit 52b is normal if the state in which the detection value of current to be controlled is a prescribed value or less continues for a certain period.

Step 6A-6

The system control unit 120(6) inputs an operation command S3 including a current command I* or a power command P* to the converter control unit 52b after determining that the converter control unit 52b is normal.

In this way, the converter control unit 52b controls the current or the power between the primary side and the secondary side to match the command.

Note that the current to be controlled is one of the converter primary side current I1P (or I1N) and the converter secondary side current I2P (or I2N).

Note that an operation command S3 including a voltage command V* may be input to the converter control unit 52b from the system control unit 120(6), and the converter control unit 52b controls the converter circuit 51b so that the voltage V2 of the primary side capacitor 43 matches the voltage command V* in this case.

Step 7A-6

If an operation command C1 including a stopping command is input from the outside, the system control unit 120(6) inputs an operation command S3 to cause the converter control unit 52b to gradually reduce the current of the converter to zero.

The converter control unit 52b carries out control so that the current of the converter circuit 51b is gradually reduced, eventually to zero. The time required for reducing the current to zero can arbitrarily be set.

If the state in which the current is at a prescribed value or less continues for a certain period, the system control unit 120(6) inputs an operation command S3 to stop the DC-DC converter 50(2), and the converter control unit 52b turns off the switching elements 51b1 and 51b2, and outputs the state as a status signal F3.

The system control unit 120(6) confirms the status signal F3 and confirms that the DC-DC converter 50(2) has normally been stopped.

Note that the current to be controlled is one of the converter primary side current I1P (or I1N) and the converter secondary side current I2P (or I2N).

Note that the current is reduced to zero and then the switching elements 51b1 and 51b2 are turned off, so that excess voltage or the like caused by the abrupt change of the primary side capacitor voltage V2 can be prevented.

Step 8A-6

The step is the same as step 8A-1 according to the first embodiment when the system control unit 120(6) and the DC-DC converter unit 50(2) are substituted for the system control unit 120(1) and the DC-DC converter unit 50(1), respectively, and therefore the description will not be provided.

Secondary Side Activation

Step 1B-6

If the control power supply for the system control unit 120(6) is turned on and a command C1 including an activation command is input from the outside, the system control unit 120(6) confirms a status signal F10 from the power storage unit monitor 112 of the power storage unit 110 and turns on the closing commands S6 and S7 for the switches 71b and 71c provided that the state in which there is no abnormality and the secondary side voltage V4 detected by the voltage detector 81 is at a prescribed value or more continues for a certain period. In this way, the closing coils 31a3 of the switches 71b and 71c are driven, and the main contacts 31a1 are closed. The auxiliary contacts 31a2 linked to the main contacts 31a1 are closed accordingly, and auxiliary contact signals F6 and F7 indicating the states of the auxiliary contacts 31a2 are output to the system control unit 120(6).

The system control unit 120(6) recognizes that the switches 71b and 71c have normally been turned on if the state in which the closing command S6 and S7 are on, the auxiliary contacts 31a2 of the switches 71b and 71c are surely closed, and the auxiliary contact signals F6 and F7 are on continues for a certain period.

Note that the switches 71b and 71c may be turned on simultaneously or sequentially. If they are sequentially turned on, and the peak power necessary for turning them on may be reduced, and a control power supply with only a small peak withstand voltage may be used, so that a compact and lightweight power storage system can be obtained.

When the switches 71b and 71c are turned on, the primary side capacitor 43 is charged through the charging resistor 72 and the diode units of the switching elements 51b1 and 51b2 of the DC-DC converter 50(2).

After determining that the switches 71b and 71c have normally been turned on, if the state continues for a certain period or if the difference between the secondary side voltage V4 and the primary side capacitor voltage V2 becomes a prescribed value or less and a prescribed period elapses, the system control unit 120(6) determines that the initial charging of the primary side capacitor 43 is complete and outputs a closing command S5. This excites the coil 31a3 of the switch 71a and the main contact 31a1 is closed.

The system control unit 120(6) determines that the switch 71a has normally been turned on if the state in which the auxiliary contact 31a2 is surely closed and the auxiliary contact signal F5 is on continues for a certain period.

Step 2B-6

Upon determining that the switch 71a has normally been turned on, the system control unit 120(6) outputs an operation command S3 to the converter control unit 52a. At the time, S3 is a signal including a command to have the DC-DC converter 50(2) operated in a boost charging mode in order to further charge the primary side capacitor 43, primary side capacitor voltage V2 and primary side voltage V1. Upon receiving the operation command S3, the converter control unit 52b has the converter circuit 51b operated to allow necessary power to be passed from the secondary side to the primary side and further charges the primary side capacitor 43. At the time, in order to prevent the primary side capacitor 43 from being damaged by abrupt charging, the primary side capacitor 43 is charged while the current in the converter circuit 51b is controlled so that the current passed from the primary side to the secondary side is restricted to a prescribed value.

If the difference between the primary side capacitor voltage V2 and the primary side voltage V1 is a prescribed value or less or if the primary side capacitor voltage V2 reaches a predetermined prescribed value, the converter control unit 52b carries out control so that the current passed from the secondary side to the primary side is reduced and the primary side capacitor voltage V2 is not raised beyond the level.

The system control unit 120(6) determines that the charging of the primary side capacitor 43 is complete if the difference between the primary side capacitor voltage V2 and the primary side voltage V1 is the prescribed value or less and a certain period elapses or if the primary side capacitor voltage V2 reaches the predetermined prescribed value.

Steps 3B-6 and 4B-6

The steps are the same as steps 3B-1 and 4B-1 according to the first embodiment when the system control unit 120(6) and the DC-DC converter unit 50(2) are substituted for the system control unit 120(1) and the DC-DC converter unit 50(1), respectively and therefore the description will not be provided.

Step 5B-1

Upon determining that the switch 8a has normally been turned on, the system control unit 120(6) outputs an operation command S3 to have the converter control unit 52b operated while keeping the converter secondary side current I2P (or I2N) at zero.

In this way, the converter control unit 52b controls the converter circuit 51b so that the converter secondary side current I2P (or I2N) is at zero.

Note that the control may be carried out so that the converter primary side current I1P (or I1N) is at zero, or the primary side current I1 detected by the current detector 11, the secondary side positive side current I3 detected by the current detector 91, or the secondary side negative side current I5 as a detection value by the current detector 93 is at zero.

If the state in which the detection value of the current to be controlled is a prescribed value or less continues for a certain period, the system control unit 120(6) determines that the converter control unit 52b is normal.

Step 6B-6

After determining that the converter control unit 52b is normal, the system control unit 120(6) inputs an operation command S3 including a current command I* or a power command P* to the converter control unit 52b.

In this way, the converter control unit 52b carries out control so that its current or the power between the primary side and the secondary side matches the command.

Note that the current to be controlled is one of the converter primary side current I1P (or I1N) and the converter secondary side current I2P (or I2N).

Note that an operation command S3 including a voltage command V* may be input to the converter control unit 52b from the system control unit 120(6), and in this case the converter control unit 52b controls the converter circuit 51b so that the primary side capacitor voltage V2 matches the voltage command V*.

Step 7B-6

If an operation command C1 including a stopping command is input from the outside, the system control unit 120(6) inputs an operation command S3 to cause the converter control unit 52b to gradually reduce the current of the converter to zero.

The converter control unit 52b controls the converter circuit 51b to gradually reduce the current, eventually to zero. The time necessary for reducing the current to zero can arbitrarily be set. If the state in which the current is at a prescribed value or less continues for a certain period, the system control unit 120(6) inputs an operation command S3 to stop the DC-DC converter 50(2), and the converter control unit 52b turns off the switching elements 51b1 and 51b2 and outputs the state as a status signal F3. The system control unit 120(6) confirms that the converter 50(2) has normally been stopped based on the status signal F3.

Note that the current to be controlled is one of the converter primary side current I1P (or I1N) and the converter secondary side current I2P (or I2N).

Note that the current is reduced to zero and then the switching elements 51b1 and 51b2 are turned off, so that excess voltage or the like caused by abrupt change in the primary side capacitor voltage V2 can be prevented.

Step 8B-6

The step is the same as step 8B-1 according to the first embodiment when the system control unit 120(6) and the DC-DC converter 50(2) are substituted for the system control unit 120(1) and the DC-DC converter 50(1), respectively, and therefore the description will not be provided.

By the above-described operation steps from the activation through the steady state operation to the stopping, a power storage system capable of reliable operation can be obtained.

Note that if only the operation by the primary side activation is necessary, the switch 71b of the secondary side switch unit 70(1) and the charging resistor 72 are not necessary and may be removed.

Meanwhile, if only the operation by the secondary side activation is necessary, the switch 31b of the primary side switch unit 30(1) and the charging resistor 32 are not necessary and may be removed.

Now, a method of detecting abnormalities and operation carried out when an abnormality is detected in the power storage system according to the sixth embodiment will be described in detail.

In order to allow the power storage system to operate in a safe and stable manner, appropriate measures must be taken quickly in response to the kind of an abnormality in each element of the power storage system. Therefore, a method of detecting abnormalities and measures to address the abnormalities according to the kinds of the abnormalities that are crucial will be described.

Abnormality Detection 1-6

Differential Current Abnormality Detection

If the state in which the primary side differential current I2 or the secondary side differential current I4 as the output of the current detector 12 or 92 is more than a prescribed value continues for a certain period, the system control unit 120(6) determines that leakage current caused by insulation degradation increases somewhere in the circuit, turns off the closing signals S0 to S2 and S5 to S7 for the switches 8a, 31a, 31b, and 71a to 71c, turns off the switching elements 51b1 and 51b2 of the DC-DC converter 50(2), and inputs a discharge command S4 to the discharge circuit unit 45(3), so that the primary side capacitor 43 is discharged.

The operation allows the increase in leakage current to be detected and the power storage system to be quickly stopped, so that further damages can be prevented.

Note that such prescribed values may be provided in a plurality of stages, and if the differential current is sufficiently insignificant, the value may be recorded or indicated by a storage device (not shown) or an indicator lamp (not shown) at the system control unit, the device, the driver's seat or the like for encouraging checking without stopping the power storage system.

Abnormality Detection 2-6

Switch Abnormality Detection

The system control unit 120(6) determines that the switch 8a has an abnormality if the state in which the main contact 31a1 is not closed because of a failure or the like in the closing coil 31a3 of the switch 8a though the closing command S0 for the switch 8a is on, the auxiliary contact 31a2 is not closed, and the auxiliary contact signal F0 is not turned on continues for a certain period.

Note that abnormalities are detected for the switches 31a, 31b, and 71a to 71c by the same method.

If an abnormality is detected in any of the switches 8a, 31a, 31b, and 71a to 71c, the system control unit 120(1) turns off the closing commands S0 to S2 and S5 to S7 for all the switches 8a, 31a, 31b, and 71a to 71c, turns off the switching elements 51b1 and 51b2 of the DC-DC converter 50(2), and inputs a discharge command S4 to the discharge circuit unit 45(3), so that the primary side capacitor 43 is discharged.

By the above-described operation, a failure in a switch is detected, and the power storage system can quickly be stopped, so that further damages can be prevented.

Abnormality Detection 3-6

Primary Side Capacitor Charging Abnormality Detection (in Primary Side Activation)

Upon determining that the switch 31b has normally been turned on in the above-described step 2A-6 in the primary side activation after a constant time is passed, the system control unit 120(6) determines that charging cannot be completed because of an abnormality such as a ground fault in the primary side capacitor 43 if the difference between the primary side voltage V1 and the primary side capacitor voltage V2 is a prescribed value or more or if the primary side current I1 is passed in an amount equal to or more than a prescribed value, turns off the closing commands S0 to S2 for the switches 8a, 31a, and 31b that have been turned on by then, and inputs a discharge command S4 to the discharge circuit unit 45(3) to discharge the primary side capacitor 43.

By the operation described above, an abnormality in the charging circuit for the primary side capacitor 43 can be detected, so that the power storage system can quickly be stopped, and further damages can be prevented.

Abnormality Detection 6-6

Primary Side Capacitor Charging Abnormality Detection (in Secondary Side Activation)

In the above-described steps 2B-5 and 2B-6 in the secondary activation, if the initial charging and charging of the primary side capacitor 43 is not complete within a prescribed period or a status signal F3 indicating a failure in the converter is received from the converter control unit 52b, the system control unit 120(6) determines that there is an abnormality in the DC-DC converter 50(2) or in the periphery of the primary side capacitor 43, turns off the closing commands S6 and S7 for the switches 71b and 71c that have been turned on by then, stops the switching elements 51b1 and 51b2 of the DC-DC converter 50(2), inputs a discharge command S4 to the discharge circuit unit 45(3) and discharges the primary side capacitor 43.

By the above-described operation, an abnormality in the charging circuit for the primary side capacitor 43 can be detected, so that the power storage system can quickly be stopped, and further damages can be prevented.

Abnormality Detection 7-6

Primary Side Capacitor Excess Voltage Detection

If the primary side capacitor voltage V2 detected by the voltage detector 42 exceeds a prescribed value, the system control unit 120(6) stops the switching elements 51b1 and 51b2 in the DC-DC converter 50(2), turns off the closing commands S1, S2, and S5 to S7 for the switches 31a, 31b, and 71a to 71c, inputs a discharge command S4 to the discharge circuit unit 45(3), and discharges the primary side capacitor 43.

By the above-described operation, excess voltage for the primary side capacitor voltage V2 can be detected, so that the power storage system can quickly be stopped, and further damages can be prevented.

Abnormality Detection 9-6

DC-DC Converter Excess Current Detection

The system control unit 120(6) turns off the switching elements 51b1 and 51b2 in the DC-DC converter 50(2) if current at the switching elements 51b1 and 51b2 in the converter circuit 51b is at a prescribed value or more.

Note that the switching elements 51b1 and 51b2 may be turned off if the converter secondary side current I1P (or I2N) is at a prescribed value or more instead of the current at the switching elements 51b1 and 51b2.

Note that the closing commands S1, S2, and S5 to S7 for the switches 31a, 31b, and 71a to 71c are not turned off, the discharge command S4 is not input to the discharge circuit 45(3), and the primary side capacitor 43 is not discharged.

The capacitor 43 is not discharged and only the switching elements 51b1 and 51b2 are turned off because excess current for the DC-DC converter could be generated temporarily by disturbance caused by abrupt change in the primary side capacitor voltage V2 and the phenomenon is not directly attributable to an abnormality in the DC-DC converter itself. There is little possibility for the DC-DC converter to be damaged.

By the above-described operation, excess current in the DC-DC converter can be detected, so that the power storage system can quickly be stopped and further damages can be prevented.

Furthermore, the time required for re-activation by re-charging the capacitors can be shortened.

Abnormality Detection 10-6

DC-DC Converter Temperature Abnormality Detection

The system control unit 120(6) turns off the switching elements 51b1 and 51b2 if the surface temperature of the switching elements 51b1 and 51b2 in the converter circuit 51b or the temperature of a cooling fin (not shown) having the switching elements 51b1 and 51b2 attached thereto is a set temperature or higher.

Note that the closing commands S1, S2, and S5 to S7 for the switches 31a, 31b, and 71a to 71c are not turned off, the discharge command S4 is not input to the discharge circuit 45(3), and the primary side capacitor 43 is not discharged.

The capacitor is not discharged and only the switching elements 51b1 and 51b2 are turned off because such a temperature rise in the DC-DC converter could be caused by temporary overload, the phenomenon is not directly attributable to an abnormality in the DC-DC converter itself, and there is little possibility for the DC-DC converter to be damaged.

Note that another prescribed value lower than the prescribed value may be provided and if this new prescribed value is exceeded, the current at the DC-DC converter may be controlled to be reduced so that the temperature rise is reduced, and if the prescribed value is exceeded all the same, the switching elements 51b1 and 51b2 may be turned off. This is preferable because the operation can be continued as long as possible.

By the above-described operation, a temperature abnormality in the DC-DC converter can be detected, so that the power storage system can quickly be stopped and further damages can be prevented.

Furthermore, the time required for re-activation by re-charging the capacitors can be shortened.

Abnormality Detection 11-6

Switching Element Abnormality Detection

If an abnormality in the switching elements 51b1 and 51b2 (the content of which will be detailed) in the converter circuit 51b is detected by a detecting circuit (not shown) built in each of the switching elements 51b1 and 51b2, a driving circuit (not shown) in each of the switching elements 51b1 and 51b2 or the converter control unit 52b, the system control unit 120(6) recognizes the state based on a status signal F3, then stops the switching elements 51b1 and 51b2 in the DC-DC converter 50(2), turns off the closing commands S0, S1, S2, and S5 to S7 for the switches 8a, 31a, 31b, and 71a to 71c, inputs a discharge command S4 to the discharge circuit unit 45(3) and discharges the primary side capacitor 43.

Note that if any of the built-in detecting circuits (not shown) detect an abnormality, the switching elements 51b1 and 51b2 may independently turn off without a turn-off command from the system control unit 120(2) or the converter control unit 52b. A switching element having such a function has been commercially available and referred to as an intelligent power module. In this way, the switching off may be carried out more quickly without a lag from the moment of abnormality detection, which improves the protective performance.

The above-described abnormality refers to cases where the current passed to the switching elements 51b1 and 51b2 is excessive with a sharp rising, where the temperature in the switching elements 51b1 and 51b2 is at a prescribed value or higher, and where the voltage of the on/off signals for the switching elements 51b1 and 51b2 is likely to be unstable. These phenomena could give rise to damages to the switching elements 51b1 and 51b2.

By the above-described operation, an abnormality in a switching element can be detected, so that the power storage system can quickly be stopped and further damages can be prevented.

Abnormality Detection 12-6

Primary Side Excess Current Detection

If the switch 8a opens by itself because of excess current, the system control unit 120(6) detects the state because the auxiliary contact signal S0 is turned off though the closing command S0 is on, stops the switching elements 51b1 and 51b2 in the DC-DC converter 50(2), turns off the closing commands S0, S1, S2, and S5 to S7 for the switches 8a, 31a, 31b, and 71a to 71c, inputs a discharge command S4 to the discharge circuit unit 45(3) and discharges the primary side capacitor 43.

If the switch 8a opens by itself because of excess current, it is possible that the excess current has been passed because of a short circuit or a ground fault, and therefore the above-described operation allows the power storage system to be quickly stopped, so that further damages can be prevented.

Abnormality Detection 13-6

Secondary Side Excess Current Detection

If a fuse 101a or 101b blows, the system control unit 120(6) detects the blowing since the auxiliary contact signals F8 and F9 are turned on, stops the switching elements 51b1 and 51b2 in the DC-DC converter 50(2), turns off the closing commands S0, S1, S2, and S5 to S7 for the switches 8a, 31a, 31b, and 71a to 71c, inputs a discharge command S4 to the discharge circuit unit 45(3) and discharges the primary side capacitor 43.

It is considered that the fuses 101a and 101b are blown by passage of excess current caused by a short circuit or a ground fault, and therefore the above-described operation allows the power storage system to be quickly stopped, so that further damages can be prevented.

Abnormality Detection 14-6

Power Storage Unit Abnormality Detection

The system control unit 120(6) turns off the switching elements 51b1 and 51b2 if a status signal F10 indicating a temperature abnormality, overcharge, or overdischarge is input from the power storage unit monitor 112.

Then, if a temperature abnormality is indicated, the switching elements 51b1 and 51b2 start to operate when F10 no longer indicates the temperature abnormality.

If overcharge is indicated, only the power flow from the secondary side to the primary side is allowed to operate the DC-DC converter 50(2) in order to discharge the power storage unit 110.

Conversely, if overdischarge is indicated, only the power flow from the primary side to the secondary side is allowed to operate the DC-DC converter 50(2) in order to charge the power storage unit 110.

Note that if the status signal F10 continues to indicate any of the temperature abnormality, overcharge and overdischarge after a prescribed period, the power storage unit 110 may have an unrecoverable abnormality, and therefore the system control unit 120(6) stops the switching elements 51b1 and 51b2 in the DC-DC converter 50(2), turns off the closing commands S0, S1, S2, and S5 to S7 for the switches 8a, 31a, 31b, and 71a to 71c, inputs a discharge command S4 to the discharge circuit unit 45(3) and discharges the primary side capacitor 43.

By the above-described operation, an abnormality in the power storage unit can be detected, so that the power storage system can quickly be stopped and further damages can be prevented.

Note that when any of the above-described abnormalities is detected, the occurrence of the abnormality is preferably recorded by the system control unit or displayed by an indicator lamp (not shown), an indicator monitor (not shown) or the like provided at the device, the driver's seat or the like.

Among the above-described kinds of abnormality detection, it is highly likely that the following kinds of abnormality detection worsen the damages if reactivation is performed: abnormality detection 1-6 (the differential current abnormality detection), abnormality detection 2-6 (the switch abnormality detection), abnormality detection 3-6 (the primary side capacitor charging abnormality detection in the primary side activation), abnormality detection 6-6 (the primary side capacitor charging abnormality detection in the secondary side activation), abnormality detection 11-6 (the switching element abnormality detection), abnormality detection 12-6 (the primary side excess current detection), abnormality detection 13-6 (the secondary side excess current detection), and abnormality detection 14-6 (the power storage unit abnormality detection). Therefore, the system control unit 120(6) prohibits the activation of the power storage system as soon as it detects any of these abnormalities. The activation prohibition does not end unless there is a manual operation such as pressing a reset button provided at the driver's platform, the system control unit or the like.

In this way, further damages to the affected parts can be prevented by preventing careless re-activation operation.

Among the kinds of abnormality detection described above, it is considered that the following cases are temporary phenomena caused by disturbance or the like: abnormality detection 7-6 (the primary side capacitor excess voltage detection), abnormality detection 9-6 (the DC-DC converter excess current detection), and abnormality detection 10-6 (the DC-DC converter temperature abnormality detection). Therefore, the system control unit 120(6) carries out a stopping procedure and then automatically carries out re-activation after a prescribed period. At the time, the presence/absence of another abnormality is monitored and unless an abnormality of the same kind is detected within a certain period, the operation is continued. If an abnormality of the same kind is detected within the certain period, re-activation of the power storage system is prohibited as soon as the abnormality is detected. The activation prohibition does not end unless there is a manual operation such as pressing a reset button provided at the driver's platform, the system control unit or the like.

In this way, the power storage system can be prevented from being excessively stopped by temporary abnormalities caused by disturbance, while further damages that could otherwise be caused by careless re-activation can be prevented.

Furthermore, the system control unit 120(6) carries out the following operation if the voltage of the control power supply is lower than a prescribed value.

If the voltage of the control power supply for the system control unit 120(6) is lower than the prescribed value or turned off, the system control unit 120(6) inputs a discharge command S4 to the discharge circuit unit 45(3) and the primary side capacitor 43 is discharged in order to prevent the switching elements 51b1 and 51b2 from being damaged.

At the same time, the closing commands S0, S1, S2, and S5 to S7 are turned off in order to open the switches 8a, 31a, 31b, and 71a to 71c.

The meaning of the above-described operation is the same as what is described in the first embodiment and therefore the description will not be provided.

With the structure according to the sixth embodiment described above, only two switching elements are used in the DC-DC converter unit 50(2), and therefore the DC-DC converter unit 50(2) can be compact and lightweight. Therefore, a compact and lightweight power storage system can be provided.

Seventh Embodiment

Figure 32:
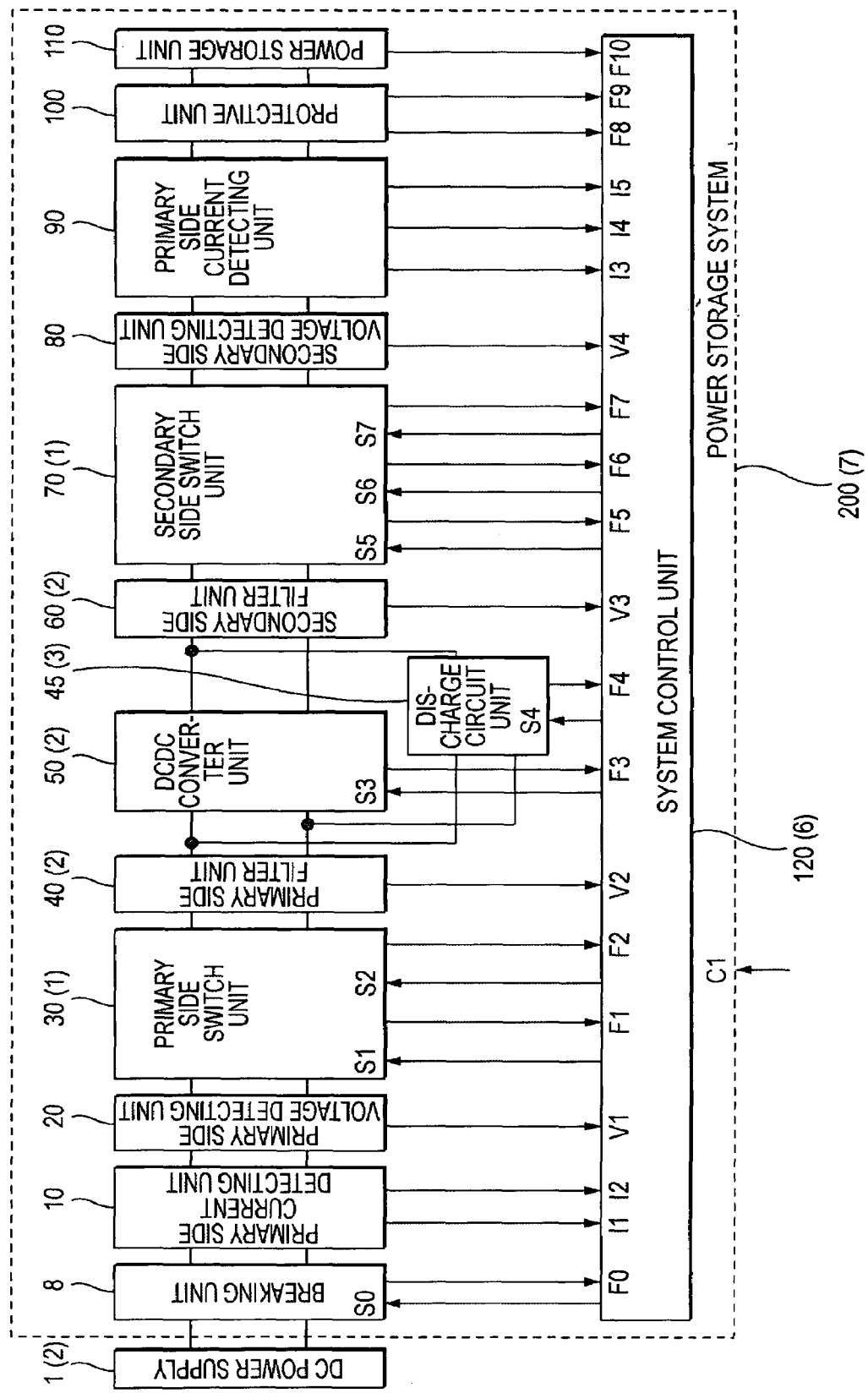
FIG. 32 is a diagram of an example of the configuration of a power storage system according to a seventh embodiment.

FIG. 32 is a diagram of an example of the configuration of a power storage system according to a seventh embodiment of the invention.

The seventh embodiment is a modification of the example of the sixth embodiment, therefore the same elements as those according to the sixth embodiment are denoted by the same reference characters and will not be described, and only the different elements will be described.

As shown in FIG. 32, a DC power supply 1(2) is provided instead of the DC power supply 1(1) and input to a power storage system 200(7).

The power storage system 200(7) is provided with a primary side filter unit 40(2) instead of the primary side filter unit 40(1).

Note that the structures of the DC power supply 1(2) and the primary side filter unit 40(2) are the same as those shown in FIGS. 19 and 20 and described in conjunction with the second embodiment and therefore the description will not be provided.

The operation steps from the activation through the steady state operation to the stopping of the power storage system 200(7) and a method of detecting abnormalities according to the seventh embodiment are described by the content of the sixth embodiment, and therefore the description will not be provided.

With the structure according to the seventh embodiment, if the power storage system is used in combination with the drive controller 1j, the reactor 1e of the drive controller 1j can be shared, and the reactor 41 in the sixth embodiment can be omitted so that a compact and lightweight power storage system can be obtained.

When the breaking unit 8 is omitted and the switch 1d in the drive controller 1j is made to serve the function, an even more compact and lightweight power storage system can be obtained.

Note that in the first to seventh embodiments, the switch 71c is provided to open the negative side of the power storage unit 110, while the minimum necessary condition is that the positive side can be opened, and therefore the switch 71c may be omitted in this case.

In the above-described first to seventh embodiments, the system control unit and the converter control unit may be formed as a single integral unit. Conversely, the control unit may be divided into arbitrary functional sections.

In the above-described first to seventh embodiments, the power storage system is connected to the DC power supply, while it is understood that it may be connected to the output of a converter circuit that rectifies an AC power supply.

The above-described first to seventh embodiments are examples of the invention, and it goes without saying that some of these embodiments may be combined, any of them may be combined with another known technique, or they may partly omitted or changed for modification without departing from the scope of the invention.

Furthermore, it should be noted that the invention is applicable not only to such a power storage system for use in an electric rolling stock or the like, but also to devices in various kinds of related fields including the fields of an automobile, an elevator, a power storage system and the like.

DESCRIPTION OF REFERENCE NUMERALS AND SIGNS

1 DC power supply
1a DC voltage source
1b overhead contact line
1c pantograph
1d switch
1e reactor
1f capacitor
1g inverter
1h electric generator or load
1i rail
8 breaking unit
8a switch
10 primary side current detecting unit
11 current detector
12 current detector
20 primary side voltage detector
21 voltage detector
30(1), 30(2) primary side switch unit
31a, 31b switch
32 charging resistor
31a1 main contact
31a2 auxiliary contact
31a3 closing coil
40(1), 40(2) primary side filter unit
41 reactor
42 voltage detector
43 primary side capacitor
44 noise filter
45(1) to 45(3) discharge circuit unit
46a primary side diode
46b secondary side diode
46c, 46c1, 46c2 discharge element
46d, 46d1, 46d2 discharge element driving circuit
46e, 46e1, 46e2 discharging resistor
50(1), 50(2) DC-DC converter unit
51a, 51b converter circuit
52a, 52b converter control unit
51a1 to 51a4 switching element
51b1, 51b2 switching element
51a5 coupling reactor
60(1), 60(2) secondary side filter unit
61 reactor
62 voltage detector
63 secondary side capacitor
64 noise filter
70(1), 70(2) secondary side switch unit
71a to 71c switch
72 charging resistor
80 secondary side voltage detecting unit
81 voltage detector
90 secondary side current detecting unit
91 to 93 current detector
100 protective unit
101a, 101b fuse
102a, 102b auxiliary contact
110 power storage unit
111 cell
112 power storage unit monitor
200(1) to 200(8) power storage system

The invention claimed is:
1. A power storage system comprising:
a DC-DC converter unit regulating DC power from a DC power supply into prescribed voltage and current; and a power storage unit storing DC power regulated by the DC-DC converter unit, wherein the power storage system, on the DC power supply side (the primary side) of the DC-DC converter unit, includes:

a primary side current detecting unit for detecting a current of a main circuit;

a primary side voltage detecting unit for detecting a voltage of the main circuit;

a primary side switch unit for opening and closing the main circuit; and a primary side filter unit for reducing harmonics of the main circuit, the power storage system, on the power storage unit side (the secondary side) of the DC-DC converter unit, includes:

a secondary side filter unit for reducing harmonics of the main circuit;

a secondary side switch unit for opening and closing the main circuit;

a secondary side voltage detecting unit for detecting a voltage of the main circuit; and a secondary side current detecting unit for detecting a current of the main circuit, and the power storage system includes a system control unit for controlling on/off states of at least the primary side switch unit, the secondary side switch unit and the DC-DC converter unit, inputted operational commands from outside of the power storage system and signals from the primary side current detecting unit, the primary side voltage detecting unit, the primary side switch unit, the primary side filter unit, the DC-DC converter unit, the secondary side filter unit, the secondary side switch unit, the secondary side voltage detecting unit, the secondary side current detecting unit and the power storage unit.

2. The power storage system according to claim 1, wherein the primary side filter unit includes a reactor connected in series with the main circuit and a primary side capacitor connected between the positive and negative sides of the main circuit, the secondary side filter unit includes a reactor connected in series with the main circuit and a secondary side capacitor connected between the positive and negative sides of the main circuit, and the power storage system further comprises a discharge circuit unit for discharging the primary side capacitor and the secondary side capacitor separately or simultaneously in response to a command from the system control unit.

3. The power storage system according to claim 2, wherein each of the primary side filter unit and the secondary side filter unit has a noise filter.

4. The power storage system according to claim 2, wherein the system control unit recognizes the completion of the charging of the primary side capacitor when a prescribed period elapses after difference between a value detected by the primary side voltage detecting unit and a voltage of the primary side capacitor becomes a prescribed value or less.

5. The power storage system according to claim 2, wherein the primary side current detecting unit, the primary side voltage detecting unit, the primary side switch unit and the primary side filter unit are arranged in series, the power storage system further comprises a breaking unit having current breaking means between the DC power supply and the primary side current detecting unit.

6. The power storage system according to claim 5, wherein the breaking unit includes a switch having a main contact and an auxiliary contact mechanically coupled thereto the main contact.

7. The power storage system according to claim 6, wherein the system control unit determines that the breaking unit turns on normally by receiving an auxiliary contact signal from the breaking unit after the system control unit outputs a closing command to the breaking unit.

8. The power storage system according to claim 5, wherein the secondary side filter unit, the secondary side switch unit, the secondary side voltage detecting unit and the secondary side current detecting unit are arranged in series, the power storage system further comprises a protective unit having current breaking means between the secondary side current detecting unit and the power storage unit.

9. The power storage system according to claim 8, wherein the protective unit includes means for detecting the state of the current breaking means.

10. The power storage system according to claim 8, wherein the system control unit detects abnormalities based on signals from the breaking unit, the primary side current detecting unit, the primary side voltage detecting unit, the primary side switch unit, the primary side filter unit, the DC-DC converter unit, the secondary side filter unit, the secondary side switch unit, the secondary side switch unit, the secondary side voltage detecting unit, the secondary side current detecting unit, the protective unit and the power storage unit and the system control unit, according to the content of the abnormality, controls at least one of the breaking unit, the primary side switch unit, the DC-DC converter unit, the discharge circuit unit and the secondary side switch unit.

11. The power storage system according to claim 10, wherein when the content of the abnormality indicates that the primary side current detecting unit detects the difference between current flows through a positive side line and current flows through a negative side line is a prescribed value or more, or when the secondary side current detecting unit detects the difference between current flows through a positive side line and current flows through a negative side line is a prescribed value or more, the system control unit turns off at least the primary side switch unit, the secondary side switch unit and the DC-DC converter unit and turn on the discharge circuit unit connected to the primary side switch unit and the secondary side switch unit.

12. The power storage system according to claim 10, wherein when the abnormality exists in any of the breaking unit, the primary side switch unit and the secondary side switch unit, the system control unit turns off at least the primary side switch unit, the secondary side switch unit and the DC-DC converter unit and turn on the discharge circuit unit.

13. The power storage system according to claim 10, wherein when the content of the abnormality indicates that a charging abnormality in the primary side capacitor or the secondary side capacitor, the system control unit turns off at least the primary side switch unit, the secondary side switch unit and the DC-DC converter unit and turn on the discharge circuit unit.

14. The power storage system according to claim 10, wherein when the content of the abnormality indicates that over voltage occurs on the primary side capacitor or the secondary side capacitor, the system control unit turns off at least the primary side switch unit, the secondary side switch unit and the DC-DC converter unit and turn on the discharge circuit unit.

15. The power storage system according to claim 10, wherein when the content of the abnormality indicates that over current flows through the DC-DC converter unit, the system control unit turns off the DC-DC converter unit.

16. The power storage system according to claim 10, wherein when the content of the abnormality indicates that temperature of the DC-DC converter unit is abnormal, the system control unit turns off the DC-DC converter unit.

17. The power storage system according to claim 10, wherein when the abnormality occurs on a switching element in the DC-DC converter unit, the system control unit turns off at least the primary side switch unit, the secondary side switch unit and the DC-DC converter unit and turn on the discharge circuit unit.

18. The power storage system according to claim 10, wherein when the content of the abnormality indicates that self opening of the breaking unit, the system control unit turns off at least the primary side switch unit, the secondary side switch unit and the DC-DC converter unit and turn on the discharge circuit unit.

19. The power storage system according to claim 10, wherein when the content of the abnormality indicates that self opening of the protective unit, the system control unit turns off at least the primary side switch unit, the secondary side switch unit and the DC-DC converter unit and turn on the discharge circuit unit.

20. The power storage system according to claim 10, wherein when the abnormality occurs on the power storage unit, the system control unit turns off at least the primary side switch unit, the secondary side switch unit and the DC-DC converter unit and turn on the discharge circuit unit.

21. The power storage system according to claim 10, wherein when the system control unit detects an abnormality, the system control unit stores the content of the abnormality and notifies an external device of the abnormality.

22. The power storage system according to claim 10, wherein the system control unit divides the abnormalities, based on their contents, into a plurality of categories, the abnormalities are divided at least into those that allow automatic reactivation to be carried out after stopping caused by the abnormality detection and those that allow reactivation to be carried out only after manual resetting operation is performed.

23. The power storage system according to claim 1, wherein the primary side switch unit has means for opening and closing the positive side of the main circuit.

24. The power storage system according to claim 23, wherein the primary side switch unit includes a switch having a main contact and an auxiliary contact mechanically coupled thereto the main contact.

25. The power storage system according to claim 24, wherein the primary side switch unit includes a circuit having the switch and a charging resistor connected to the switch.

26. The power storage system according to claim 24, wherein the system control unit determines that the primary side switch unit turns on normally by receiving an auxiliary contact signal from the primary side switch unit after the system control unit outputs a closing command to the primary side switch unit.

27. The power storage system according to claim 1, wherein the primary side current detecting unit has means for detecting the difference between current flows through a positive side line and current flows through a negative side line.

28. The power storage system according to claim 1, wherein the DC-DC converter unit includes a bidirectional buck-boost converter circuit.

29. The power storage system according to claim 28, wherein the secondary side capacitor built in the secondary side filter unit is charged by the output of the bidirectional buck-boost converter circuit when the power storage system is activated with DC power from the DC power supply.

30. The power storage system according to claim 1, wherein the DC-DC converter unit includes a bidirectional buck converter circuit.

31. The power storage system according to claim 30, wherein the primary side capacitor built in the primary side filter unit is charged by the power of the power storage unit when the power storage system is activated with DC power from the power storage unit.

32. The power storage system according to claim 1, wherein the secondary side switch unit has means for opening and closing only the positive side or both the positive side and the negative side of the main circuit.

33. The power storage system according to claim 32, wherein the secondary side switch unit includes a switch having a main contact and an auxiliary contact mechanically coupled thereto the main contact.

34. The power storage system according to claim 33, wherein the system control unit determines that the secondary side switch unit turns on normally by receiving an auxiliary contact signal from the secondary side switch unit after the system control unit outputs a closing command to the secondary side switch unit.

35. The power storage system according to claim 33, wherein the secondary side switch unit includes a circuit having the switch and a charging resistor connected to the switch.

36. The power storage system according to claim 1, wherein the secondary side current detecting unit has means for detecting the difference between current flows through a positive side line and current flows through a negative side line.

37. The power storage system according to claim 1, wherein the power storage unit includes a plurality of cells connected in series-parallel and a status signal from a monitor device for detecting the state of the plurality of cells is inputted to the system control unit.

38. The system according to claim 2, wherein the system control unit recognizes the completion of the charging of the secondary side capacitor when a prescribed period elapses after difference between a value detected by the secondary side voltage detecting unit and a voltage of the secondary side capacitor becomes a prescribed value or less.

39. The power storage system according to claim 1, wherein the system control unit controls the current of the DC-DC converter unit to be zero after determining that the primary side switch unit and the secondary side switch unit turn on normally.

40. The power storage system according to claim 1, wherein in order to stop the power storage system, the system control unit controls the DC-DC converter unit so that the current of the DC-DC converter unit is gradually reduced at a prescribed rate to be zero and wherein switching elements built in the DC-DC converter unit are turned off after the current become zero.

41. The power storage system according to claim 1, wherein the system control unit turns off the primary side switch unit and the secondary side switch unit after switching elements built in the DC-DC converter unit are turned off.

\* \* \* \* \*